United States Patent [19]

Suzuki et al.

[11] 4,200,371
[45] Apr. 29, 1980

[54] PHOTOGRAPHIC CAMERA WITH FILM SPEED SETTING SYSTEM

[75] Inventors: Ryoichi Suzuki; Tetsuya Taguchi, both of Kawasaki; Toyotosi Suzuki, Tokyo; Noriaki Sanada, Yokohama; Nobuo Tezuka, Tokyo; Takashi Uchiyama, Yokohama, all of Japan

[73] Assignee: Canon Kabushiki Kaisha, Tokyo, Japan

[21] Appl. No.: 841,469

[22] Filed: Oct. 12, 1977

[30] Foreign Application Priority Data

Oct. 15, 1976 [JP] Japan .................................. 51-123598
Oct. 21, 1976 [JP] Japan .................................. 51-126516
Oct. 21, 1976 [JP] Japan .................................. 51-126517
Oct. 21, 1976 [JP] Japan .................................. 51-126518
Nov. 4, 1976 [JP] Japan .................................. 51-132612
Nov. 5, 1976 [JP] Japan .................................. 51-132822

[51] Int. Cl.² .................... G03B 7/08; G03B 17/36; G03B 15/03; G03B 17/18; G03B 17/38
[52] U.S. Cl. ...................................... 354/21; 354/37; 354/58; 354/217; 354/51; 354/149; 354/31; 354/60 E; 354/289; 354/268
[58] Field of Search ................. 354/21, 289, 28, 37, 354/32, 33, 41, 31, 48, 50, 51, 58, 59, 60 R, 60 E, 60 L, 127, 128, 268, 53, 171, 173, 217, 218, 53, 149; 352/78 C

[56] References Cited

U.S. PATENT DOCUMENTS

| 3,303,765 | 2/1967 | Jakob et al. ............................. 354/58 |
| 3,481,259 | 12/1969 | Langnau ............................. 354/41 X |
| 3,601,024 | 8/1971 | Pagel ................................. 354/41 X |
| 3,727,526 | 4/1973 | Hinds ................................. 354/51 |
| 3,769,887 | 11/1973 | Nobusawa ............................. 354/51 |
| 3,947,862 | 3/1976 | Watanabe et al. ................. 354/58 X |
| 3,949,412 | 4/1976 | Taguchi et al. ............... 354/60 L X |
| 4,016,575 | 4/1977 | Uchiyama et al. ..................... 354/33 |
| 4,024,557 | 5/1977 | Aoyama et al. ............... 352/78 C X |
| 4,053,908 | 10/1977 | Saito et al. ............................. 354/31 |
| 4,074,286 | 2/1978 | Suzuki ................................. 354/21 |
| 4,074,287 | 2/1978 | Iwata ................................... 354/31 |
| 4,077,042 | 2/1978 | Imura et al. .......................... 354/21 |

FOREIGN PATENT DOCUMENTS 451148 1/1970 Japan ......................................... 354/21

Primary Examiner—Michael L. Gellner
Assistant Examiner—William B. Perkey
Attorney, Agent, or Firm—Toren, McGeady and Stanger

[57] ABSTRACT

A manually operable or automatic film speed setting system adapted for use in an electronic exposure control apparatus of a photographic camera. When a film cartridge having an electrically conductive marker representative of the sensitivity of film therein is loaded in the camera, information representative of film speed is automatically introduced into the exposure value computer regardless of the manually switched position of the inherent film speed dial different from that for the sensitivity of the used film.

37 Claims, 34 Drawing Figures

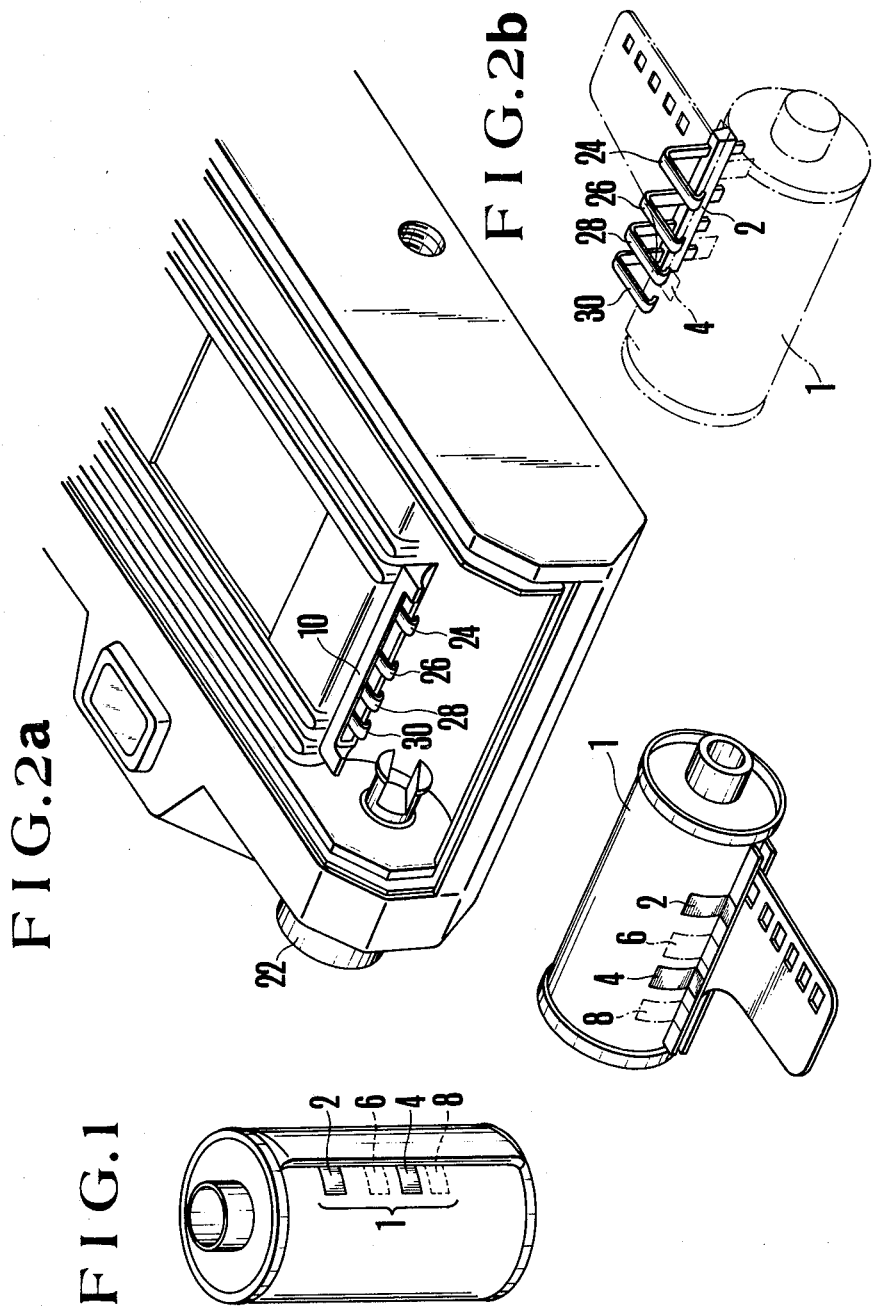

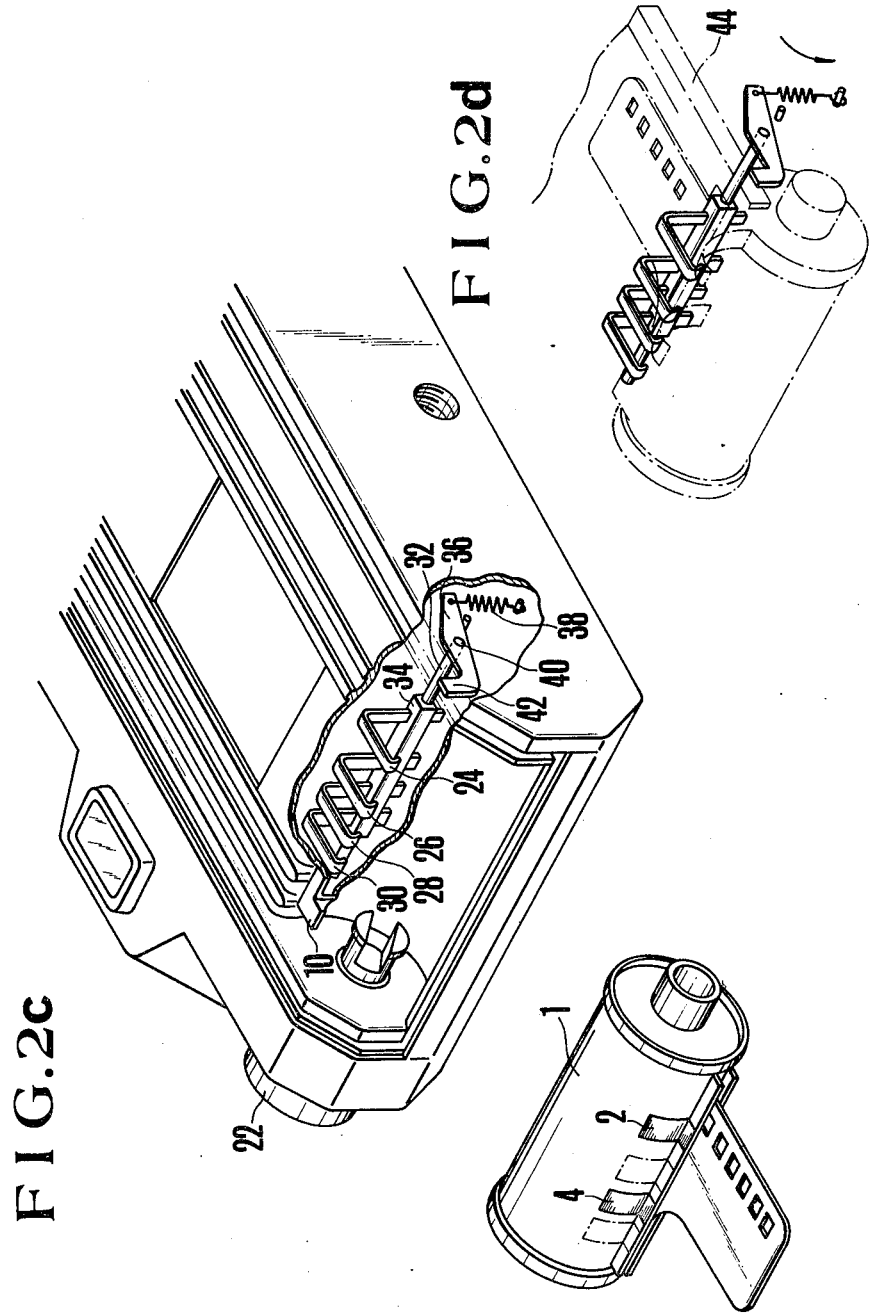

PHOTOGRAPHIC CAMERA WITH FILM SPEED SETTING SYSTEM

BACKGROUND OF THE INVENTION

1. Field of the Invention

This invention relates to photographic cameras, and, more particularly, to a manually operable or automatic film speed setting system using an electrically conductive marker representative of the sensitivity of film. Still more particularly, it relates to improvements of the film speed setting system in that:

When a cartridge having a marker representative of the sensitivity of film therein is loaded in the camera, the otherwise necessary manipulation of the film speed dial may be overlooked as information representative of film speed is automatically introduced into the computation of an effective exposure value.

The output of the automatic film speed setting means is displayed so that the operator can be made to remember what film speed information is automatically set, not only when the film is transported by a first few frames to obtain a first fresh film frame, but also at a desired point in time when the film is successively advanced for exposure purposes.

Even when a cartridge having the marker is used, the manually operable film speed setting means can be rendered effective as desired.

2. Description of the Prior Art

In setting the given film sensitivity into an exposure control circuit, it has been the prior art practice to operate a film speed dial arranged on the top panel of the camera housing. As a number of films of different sensitivity is accommodated in a single camera, therefore, there is a high possibility for the busy operator of overlooking the necessary manipulation of the film speed dial. This repetition of settings is a very troublesome operation particularly when the operator's concentration is on an object to be photographed.

It is known to provide a film cartridge having a marker representative of the sensitivity of film therein as constructed in the mechanical form adapted for use with an instant type camera or pocket type camera in order to automatically account the sensitivity of film. In cameras having electronic control apparatus, because of the convenience of an electrical signal, this marker has been recently constructed in the form of a number of electrical conductive patches, the combination and permutation of which depend upon the sensitivity of film contained in that cartridge.

So long as the availability of film cartridges having no such markers is universal, it is required that the camera be provided with both the manually operable and the automatic film speed setting means. If the simultaneous use of the manually operable and automatic setting means is not combined with means for selectively introducing the outputs of these setting means into the exposure value computer of the camera in a preferably automatic manner, it is impossible to obtain a correct exposure when the switched position of the film speed dial is left in a position which is different from that for the sensitivity of film as the cartridge having the marker is used.

With the foregoing in mind, the present invention has for the general object to provide a manually operable or automatic film speed setting system which is characterized in that:

(1) When a cartridge having a marker (hereinafter referred to as "Auto-film cartridge") representative of the sensitivity of film therein is loaded in the camera, the exposure value computing circuit accounts for this sensitivity, while the output of the manually operable film speed setting means is automatically cut off from entering said circuit.

(2) The output of the manually operable film speed setting means remains unchanged from the value which occurs just before the Auto-film cartridge is inserted into the camera.

(3) The operator is aware if the Augo-film cartridge is being loaded in the camera.

(4) What film speed is automatically set is displayed.

(5) The film speed display is performed by utilizing the film speed dial in combination with a monitor and safety circuit.

(6) The film speed value display can be established not only during the preparatory transportation of the film in vain, but also at any desired time during the advancements of the film for exposure purposes.

(7) Since a battery check button is utilized in actuating the film speed value display after the preparatory transportation of the film, the use of the Auto-film cartridge leads to the simultaneous display of whether the actual voltage of the electrical power source is above a satisfactory operating level. In addition thereto, the shutter speed and diaphragm aperture value as the exposure determining factor can be displayed when the battery check button is operated.

(8) Even after the Auto-film cartridge is loaded into the camera, it is made possible to change the automatically set film speed to a desired one by use of the film speed dial.

These and other features and advantages of the present invention will become apparent from the following detailed description of embodiments of the invention taken in conjunction with the accompanying drawings in which:

BRIEF DESCRIPTION OF THE DRAWINGS

FIG. 1 is a perspective view of a film cartridge having a marker positioned adjacent a lower lip of a film exit thereof to represent a certain sensitivity of the film contained therein.

FIGS. 2(a) to 2(d) are perspective views showing an example of a sensing mechanism arranged near a cartridge chamber within a camera housing upon contact with the marker of FIG. 1 to sense the film sensitivity.

DESCRIPTION OF THE PREFERRED EMBODIMENTS

Figure 3A:
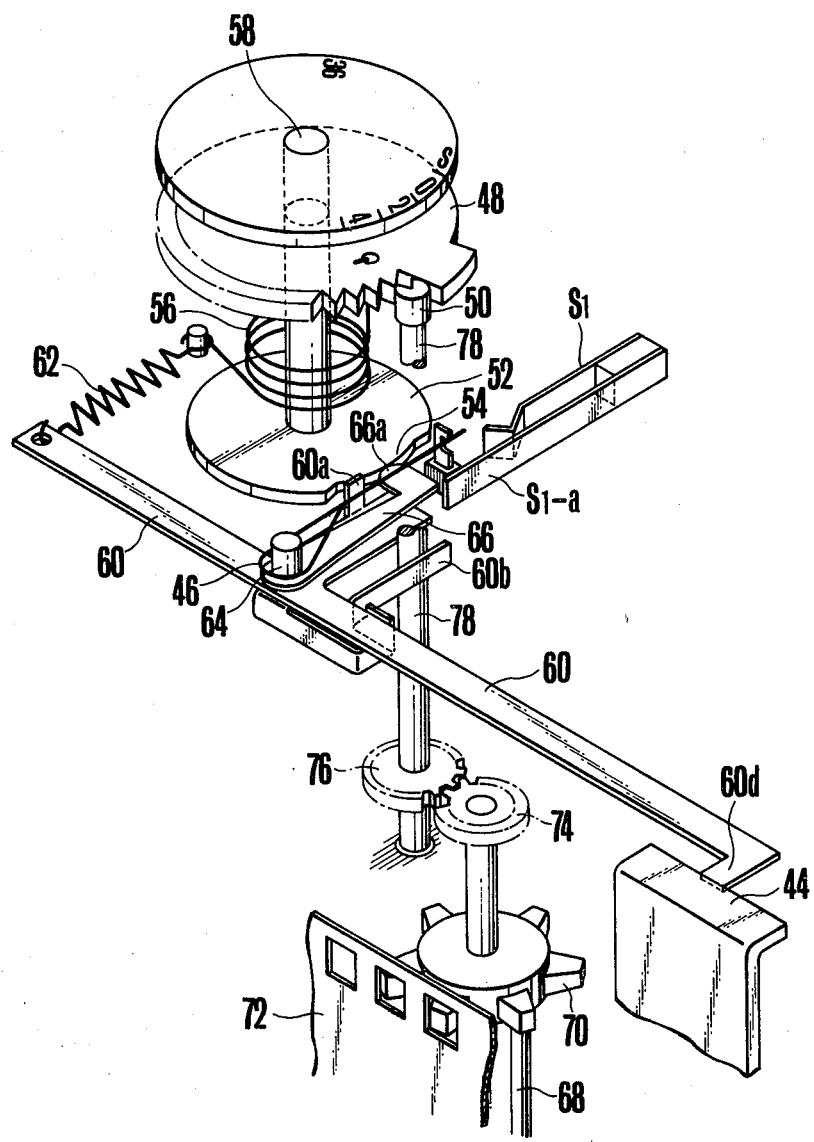
FIGS. 3(a) to 3(c) are perspective views showing an example of an arrangement of a display control switch and an actuating member therefor as associated with a film counter.

Referring to FIGS. 1 to 4, there is shown one embodiment of a manually operable or automatic film speed setting system according to the present invention applied to a photographic camera having automatic exposure control. FIG. 1 shows a 35 m/m film container such as cartridge or cassette provided with a marker 1. The marker indicates the sensitivity of the film therein and which is constructed in the form of one or two electrically conductive rectangular patch 2 or patches 2 and 4 arranged adjacent a lower lip of a film exit (FIG. 2) upon insertion into a cartridge chamber within the camera housing (and closure of the back cover thereof) to be brought into electrical contact with a sensing mechanism of FIG. 2. The permutation and combination of the patches depend on the film speed of that cartridge. For example, only one patch 2 corresponds to ASA 100, two patches 2 and 4 shown by solid lines to ASA 400, two patches 2 and 6, the latter being shown by phantom lines, to ASA 200, and two patches 2 and 8, the latter being shown by phantom lines, to ASA 800. Although not shown, these patches are electrically connected to each other in each of these pairs.

FIGS. 2(a) and 2(b) show an example of a marker sensing mechanism comprising four resilient electrical contacts 24, 26, 28 and 30 electrically insulated from one another and extending into a film cartridge chamber which is intended to accommodate one film cartridge through a common opening 10 provided in a cartridge pressor. When the cartridge having the marker 1 is inserted into and seated in the chamber, electrical connection is established between the path 2 and the contact 24, between the patch 6, if present, and the contact 26, and so on, to account for the sensitivity or speed of film in that cartridge. The pressor 10 serves to avoid interference between the emulsion surface of the film and the electrical contact assembly as the film is pulled past the marker sensing mechanism and a film gate to a take-up reel, and, after the completion of exposure of the film, rewinded into the cartridge by operating a crank 22.

Another example of the marker sensing mechanism is shown in FIGS. 2(c) and 2(d) wherein the electrical contacts 24, 26, 28 and 30 of FIGS. 2(a) and 2(b) are fixedly mounted on a common support 34 of electrically insulating material and turnable along with a shaft 32 which has an actuating lever 36 secured to one end thereof for protracting and retracting the electrical contacts into and from the cartridge chamber through the opening 10 when the back cover 44 of the camera housing is closed and opened respectively. For this purpose, the actuating lever 36 is biased by a spring 38 in a clockwise direction and has a probe 42 extending into the path of movement of the back cover 44.

Figure 3B:
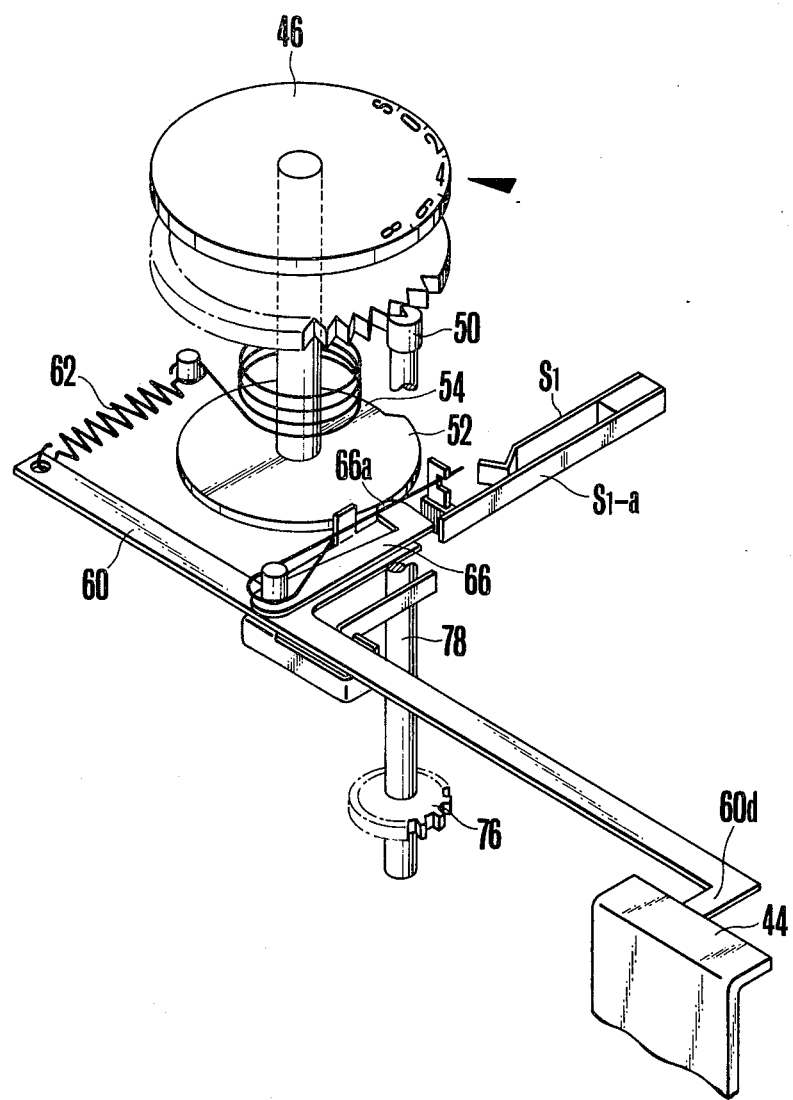
Figure 3C:
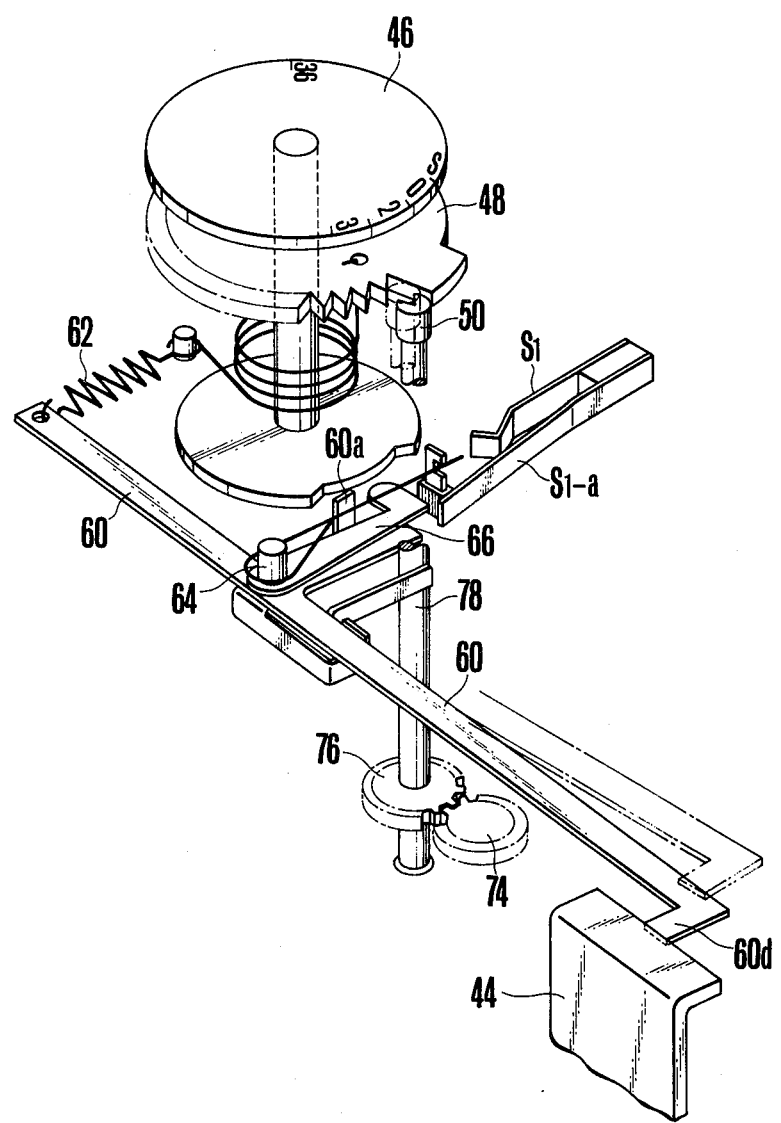

In order to inform the photographer of the fact that the setting of a given film speed is effected automatically because of the use of a film cartridge of the type shown in FIG. 1, there is provided an indicator which will be described in connection with FIG. 4 and a control switch therefor which is shown in FIGS. 3(a) to 3(c) along with an actuating member associated with a film counter mechanism. This mechanism is well known in the art as employed in a single lens reflex camera of shutter preselection automatic exposure control sold under the tradename "Canon AE-1" and includes a character disc 46 having cut thereon a symbol "S"

(Start of film feed) and a number of graduations terminating at 36 (the maximum possible number of frame fed from the cartridge), a driven gear 48 fixedly mounted on a common shaft 58 of the counter disc 46, a driving gear 50 arranged to engage with the gear 48 as shown in FIGS. 3(a) and 3(b) so long as the back cover 44 is closed, and a cam disc 52 fixedly mounted to the opposite end of the shaft 58 to that carrying the film counter disc 46 and having a radially recessed portion 54 positioned between points corresponding to symbol "S" and a character "O" upon reception of the actuating lever 66 at its cam follower tab 66a to close the control switch $S_1$ for the aforementioned indicator.

When a film winding lever (not shown) is operated to advance the film 72 through the length of one frame by a sprocket 68 with its claws 70 engaging in perforations of the film 72, motion of the sprocket 68 is transmitted through gears 74 and 76 to the driving gear 50 fixedly mounted on the common shaft 78 of the gear 76. Thus, one revolution of the driving gear 50 is effected to turn the driven gear 48 one tooth against the force of a return spring 56 and therefore the film counter disc 46 is advanced one graduation. During the advancement of a number of first frames, usually three frames, the actuating lever tab 66a remains in sliding contact with the bottom periphery of the recessed portion 54 of the cam disc 52, so that the indicator 92 (FIG. 4) glows provided that the marker type film cartridge is already inserted into the chamber of the camera. Upon further advancement of the film with a numeral character "1" placed in registry with the stationary index, the actuating lever 66 is operated with its cam follower tab 66a riding on the outer periphery of the cam disc 52, causing the movable contact $S_1$-a of the control switch $S_1$ to be taken out of electrical connection with its fixed contact $S_1$-b as shown in FIG. 3(b).

After the exposed film has been rewound on the reel within the cartridge, the photographer will open the back cover 44 with the result that a film counter resetting lever 60 is turned about a pivot axle 64 in a clockwise direction under the action of a spring 62 to a position shown in FIG. 3(c) where the driving gear 50 is disengaged from the gear 48 to permit returning movement of the latter under the action of spring 56 until a projection radially extending from the gear 48 abuts against the gear 50, while the switch $S_1$ remaining in the open position as the cam follower tab 66a is prevented from dropping into the recessed portion 54 by the engagement of an upwardly extending projection 60a with the lever 66. After the old film cartridge is replaced by new one, the photographer will turn the back cover to the light shield position, thereby the resetting lever 60 is turned counter-clockwise in engagement at its extension 60d with the back cover 44, causing the driving gear 50 to be brought into engagement with the driven gear 48 by a projection 60b, and also causing the actuating lever 66 to be moved away from the movable contact of the control switch $S_1$. Thus, the film counter mechanism is reset to the initial position shown in FIG. 3(a).

Figure 4:
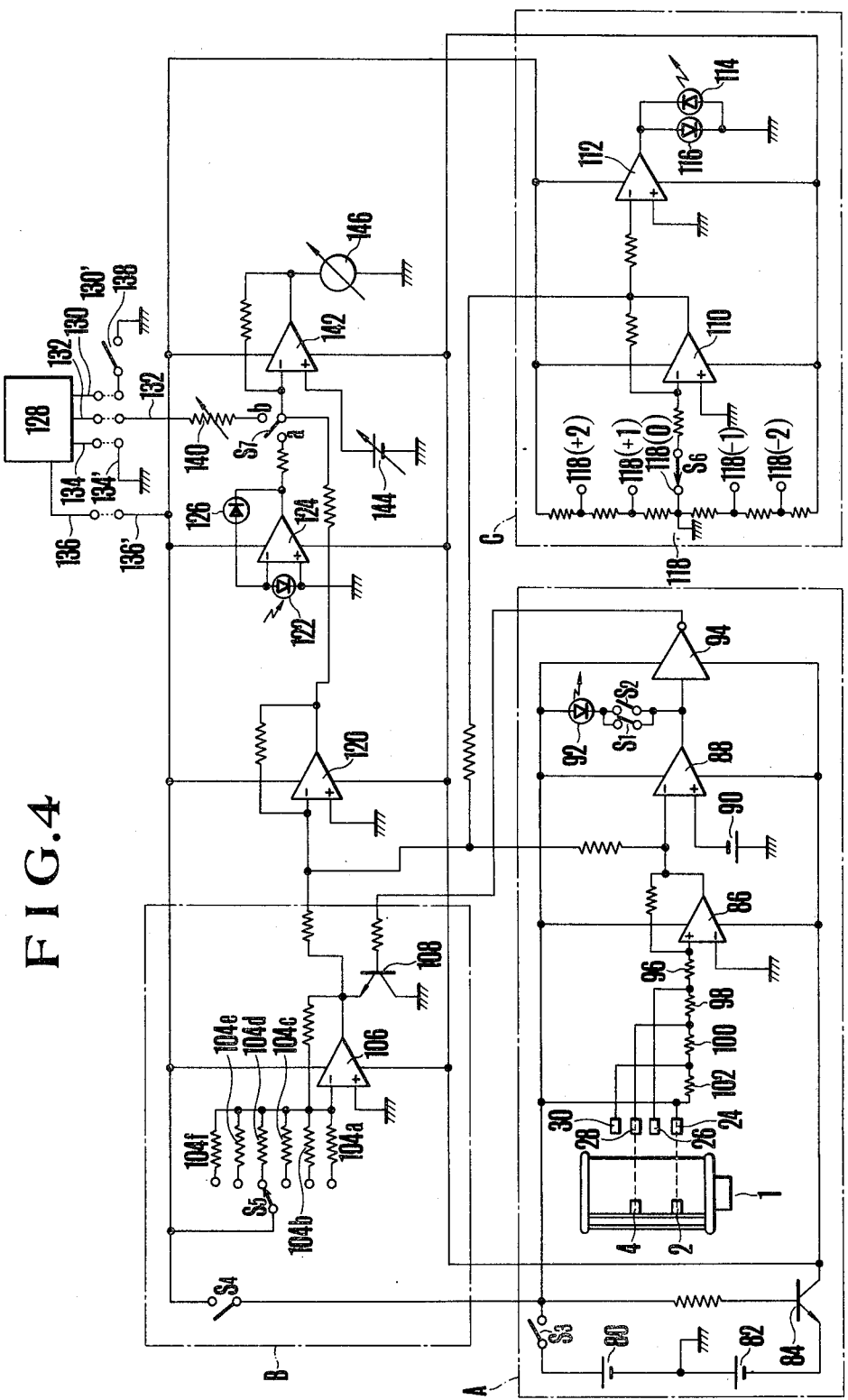
FIG. 4 is an electrical circuit diagram of one embodiment of a film speed setting system according to the present invention as associated with a shutter preselection automatic diaphragm control circuit.

Referring now to FIG. 4 there is shown an example of the embodiment of the present invention applied to an electronic exposure control device with a moving coil instrument 146 having an output member or needle movable to a plurality of positions as a function of changes in the output of an exposure value computer or operational amplifier 142 upon release of the camera to conduct the scanning of the position of the moved needle to the diaphragm mechanism of the camera thereby the proper diaphragm aperture value is determined in the one of automatic daylight and flash exposure range which was previously selected by a changeover switch $S_7$. To account for the ASA sensitivity or speed of the film which is already inserted into the camera or is intended to be used in the camera, there are provided automatically and manually film speed setting circuits enclosed in dashed blocks A and B respectively, each of which will be explained in detail below.

The automatically film speed setting circuit A includes a film speed sensing resistor string connected at one end thereof, namely, of a resistor 102 to the electrical contact 24 of FIGS. 2 and 3, the opposite end of which is connected to an inversion input of an operational amplifier 86 with its non-inversion input grounded. The other electrical contacts 26, 28 and 30 are connected to respective points on connection between resistors 96 and 98; 98 and 100; and 100 and 102 respectively. These resistors 96, 98 and 100 have progressively higher resistance values as the number for the reference character is increased. The output voltage of the operational amplifier 86 is applied both to an adder circuit which includes an operational amplifier 120 through a calibration resistor and to a comparator 88 constituting part of a setting-mode selecting circuit. The actual voltage of a reference voltage source 90 for the comparator 88 is previously adjusted so that even when a film cartridge having a marker representative of ASA 800 is used to connect the electrical contacts 24 and 30 with each other, the comparator 88 produces an output voltage of negative sign. This output voltage is applied to a light-emitting diode 92 as the aforesaid auto-setting indicator through the switch $S_1$ of FIG. 3 and also after having been inverted by an inversion circuit 94 applied to the base electrode of a switching transistor 108 in block B.

The manually operable film speed setting circuit B comprises a switch $S_5$ cooperative with a film speed dial and having a plurality of switched positions for selectively connecting the corresponding number of resistors 104a to 104f for the film sensitivities in ASA of 25, 50, 100, 200, 400 and 800 to an inversion input of an operational amplifier 106. These resistors have progressively higher resistance values in the alphabetical order. The output voltage of the operational amplifier 106 is applied through a calibration resistor to the adder circuit. The switching transistor 108 is connected at its emitter to the output terminal of the operational amplifier 106, while its collector grounded.

For adjustment of the rate at which the exposure control device can change the size of the diaphragm aperture either in dependency on the type of film of the given speed, or as desired, there is further provided a manually operable rate adjusting circuit in a dashed block C. This circuit comprises a resistor string 118 connected between the positive and negative terminals of series-connected batteries 80 and 82 by ways of the common positive and negative buses of the circuits A and B and having five taps 118a to 118e connected to respective throws of a single-pole switch $S_6$ which cooperates with a not shown manually operable knob to change the exposure level, in this instance, the size of the diaphragm aperture by +2 stops, +1 stop, 0 stop, −1 stop or −2 stops respectively, an operational amplifier 110 having an inversion input connected to the pole of the switch $S_6$ and having an output connected through a calibration resistor to the adder circuit 120, and also to an inverter 112 which constitutes part of a display circuit. This display circuit further includes light-emitting diodes 114 and 116 connected between the common output of the inverter 112 and the circuit earth in forward and reverse directions respectively.

The voltages at the outputs of the amplifiers 86 and 110 in blocks A and C, or at the outputs of the amplifiers 106 and 110 in blocks B and C are combined in the adder circuit which includes the operational amplifier 120. Information representative of the combined film speed and type from the adder circuit is combined with information representative of brightness of an object to be photographed and supplied from a light measuring device which includes a light-sensitive element 122 such as a silicon photo-cell SPC positioned in the camera finder optical system, photo-taking optical system, or on the front panel of the camera housing to receive light coming from an object to be photographed, and an operational amplifier 124 with a feedback diode 126 of logarithmic compression characteristics. The voltage at the output of the operational amplifying device 124 and 126 is proportional to the logarithm of the object brightness level as sensed by SPC.

A block 128 includes a stroboscopic lamp firing circuit of known construction as disclosed in detail in Japanese Utility Model Application Laid-Open No. Sho 47-27934 and has four interconnection terminals 130, 132, 134 and 136 arranged on the photo-flash unit housing to be attached to respective terminals of the same reference numerals primed which are arranged in a shoe on the camera housing when the photo-flash unit is attached to the camera at the shoe. Information representative of electrical energy stored on a main capacitor for the flash discharge tube in the form of a voltage is introduced from the unit through the terminals 132-and-132' connection into the inversion input of the operational amplifier 142 provided that the mode selecting switch S$_7$ is set in "b" position for flash photography after passage through a variable resistor cooperative with a distance adjusting ring of the camera. When the front shutter curtain has reached the exposure aperture full open position, a normally open switch 138 is closed to trigger the flash discharge tube for firing.

It should be noted in FIG. 4 that switch S$_2$ and light-emitting element 92 cooperate to inform a photographer whether the camera is in the automatic setting mode or the manual setting mode according to the signal produced by the film sensitivity setting circuit.

OPERATION (1) Daylight exposure with an Auto-film having ASA 400

The operator will first load a film cartridge having a marker representing ASA 400 into the chamber as shown in FIG. 2(b), or FIG. 2(d) and then close the back cover 44 to move the switch S$_1$ from the open position of FIG. 3(c) to the closed position of FIG. 3(a). The camera is assumed to be set in the shutter preselection automatic daylight diaphragm aperture control mode where the switch S$_7$ assumes "a" position. When the main switch S$_3$ is thrown, an electrical power supply control transistor 84 is rendered conducting with the start of operation of block A alone. As the marker 2, 4 connects the electrical contacts 24 and 28 to each other to short circuit the resistors 100 and 102, the operational amplifier 86 with a corresponding gain produces an output voltage dependent upon the film sensitivity, strictly speaking, proportional to the logarithm of the film sensitivity, and which is applied to the adder circuit 120 for combination with the output voltage of the previously adjusted film type setting or exposure level modifying circuit C, while the setting-mode selecting circuit is simultaneously actuated causing the light emitting diode 92 to be energized and also causing the cut-off transistor 108 to be rendered conducting. Accordingly, the manually operable film speed setting circuit B has no contribution to the exposure control.

When a shutter release button is depressed by a first stroke to close the switch S$_4$, the remaining portions of the circuit of FIG. 4 are supplied with electrical power from the batteries 80 and 82 so that the aforesaid adding function is performed. In this connection, it is to be noted that when the switch S$_6$ is moved from the illustrated position for no modification of the exposure level to either of "+2" and "+1" positions, a negative voltage appears at the output of the operational amplifier 110, and the forward connected light emitting diode 116 is energized, and vice versa. The output of the adder circuit 120 is combined with the output of the light measuring circuit 122, 124 and 126 and further with information of the preselected shutter speed set in the variable voltage source 144 by the operational amplifier 142, with the resulting output of the operational amplifier 142 being produced as a function of the various exposure control factors set in blocks A and C, the light measuring circuit and the variable voltage source 144, and being directed to the diaphragm control meter 146 by which the proper diaphragm aperture is automatically formed.

(2) Flash exposure with an Auto-film

The operator will first attach the photo-flash unit 128 to the camera at the shoe with the terminals 130, 132, 134 and 136 of the unit being automatically connected to the terminals 130', 132', 134' and 136' of the camera, then turn the mode selecting switch S$_7$ to "b" position, and then set a particular shutter speed suited for flash photography in the variable voltage source 144. Upon focusing for an object to be photographed by rotating the distance adjusting ring, the variable resistor 140 takes at a resistance value. As a voltage corresponding to the charge stored on the main capacitor of the flash unit appears at the terminal 132, the operational amplifier 142 produces an output voltage as a function of the various exposure control factors such as the actual voltage of the main capacitor, the camera-to-object distance, the film speed set in block A, the exposure level adjusting rate set in block C, and the shutter speed set in the variable voltage source 144. By this output, the meter 146 is driven with the needle thereof deflected to a position which is scanned, and the scanning result is introduced into the lens aperture mechanism of the camera, thereby automatic formation of the proper diaphragm aperture is effected.

(3) Exposure with a conventional film cartridge

As this film cartridge has no marker representative of the sensitivity of film therein, the output of the operational amplifier 86 assumes a considerably minus level and before this level gets lower than the voltage level of the standard power source, the output of the comparator 88 takes a positive level. During the preparatory transportation of the film by a first few frames for which the switch S$_1$ is closed, therefore, the light emitting diode 92 remains de-energized to inform the operator of the necessary manipulation of the film speed dial.

After the film sensitivity is set by operating the switch S$_5$, for example, to the illustrated position for ASA 200, the shutter release button may be depressed. At the first stroke, the operational amplifier 106 produces an output dependent upon the resistance value of the resistor 104d, as the switching transistor 108 is in the non-conducting state. This output voltage is combined with the output voltage from the block C by the adder circuit 120, while the output of the operational amplifier 86 in block A being cut off.

Figure 5:
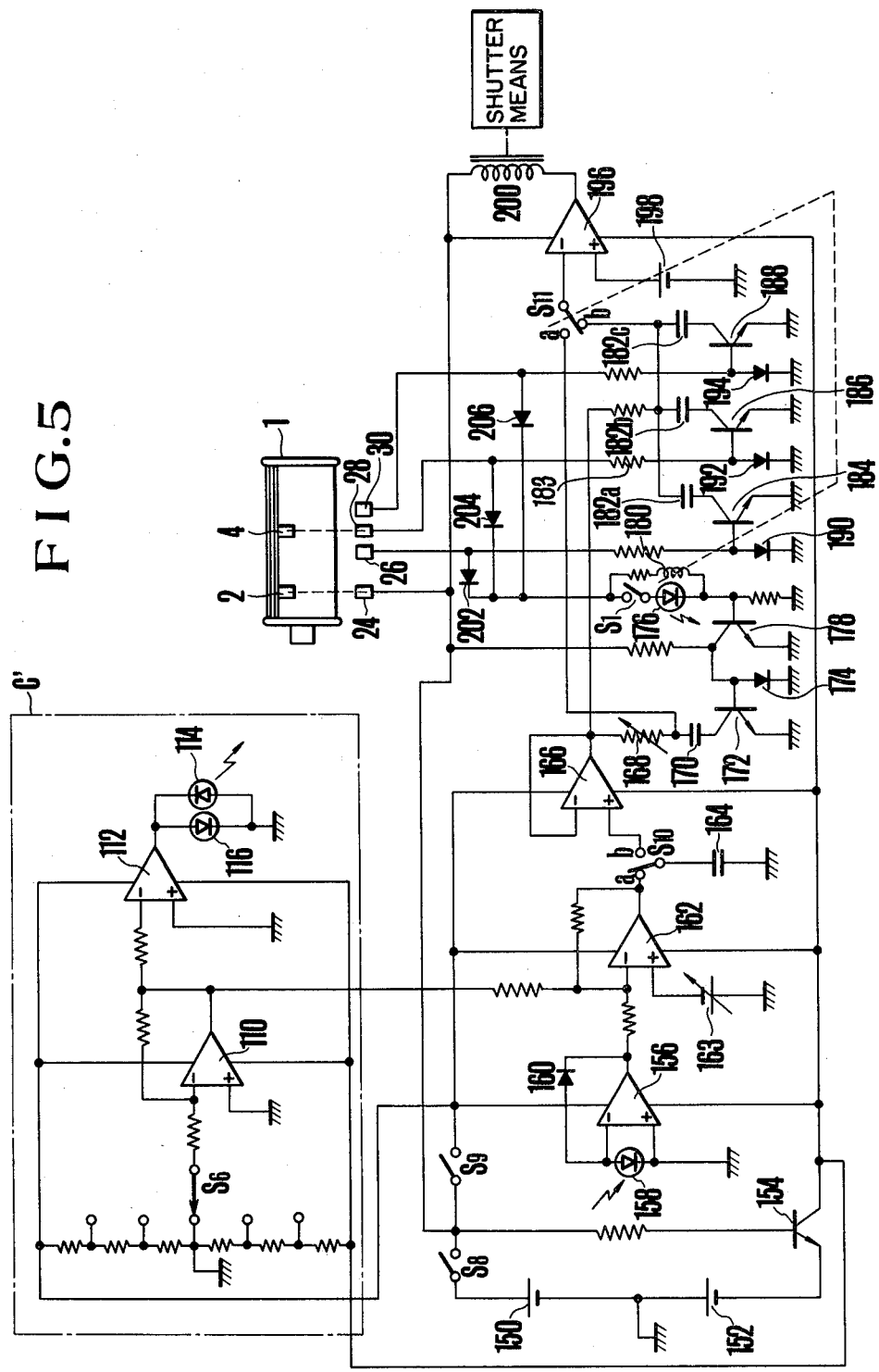
FIG. 5 is an electrical circuit diagram showing another example of the embodiment of the invention as associated with a diaphragm preselection automatic exposure time control circuit.

FIG. 5 shows another example of the manually operable or automatic film speed setting system adapted for use in a diaphragm preselection automatic shutter speed control circuit. Information representative of object brightness sensed by a light sensitive element 158 is logarithmically compressed by an operational amplifier 156 with its feedback diode 160 and then combined with information representative of exposure level adjusting rate supplied from a block C' of the same construction as that of block C of FIG. 4 by an operational amplifier 162, while a combination of a preselected diaphragm aperture value, the F-number of the used objective lens and the given correction factor is set in a variable voltage source 163 to which the non-inversion input of the operational amplifier 162 is connected. The output of the operational amplifier 162 is being stored on a capacitor 164 during a time interval between a moment at which the shutter release button has been depressed to the first stroke to close a switch S$_9$ and a moment the front shutter curtain starts to run down with simultaneous occurrence of movement of a switch S$_{10}$ from its "a" to its "b" position, where the output of the storage capacitor 164 is processed by either of manually operable and automatic film speed setting circuits.

The manually operable film speed setting circuit comprises a variable resistor 168 arranged upon manual selection of a larger ASA value by a film speed dial to take a smaller resistance value and connected at its input stage to the output of an operational amplifier 166 of voltage follower type, and a timing capacitor 170 connected in series to the output of the variable resistor 168. The thus formed timing circuit 168 and 170 generates a time variable voltage capable of reaching a trigger level for a comparator 196 during an interval of time dependent upon the output voltage of the operational amplifier 166 which is the same as that of the storage capacitor 164.

The automatic film speed setting circuit comprises three timing capacitors 182a, 182b and 182c connected at their one pole through a common resistor 183 to the output of the voltage follower operational amplifier 166, the opposite poles of which are connected to respective switching transistors 184, 186 and 188 at their collectors with their emitters grounded and with their bases connected to the respective marker sensing electrical contacts 26, 28 and 30. The ratio of the capacitance values of the capacitors 182a, 182b and 182c is adjusted as 1:½:¼. In order to insure that the individual transistors 184, 186 and 188 operate in an optimum dynamic range, there are provided diodes 190, 192 and 194 connected between the respective emitters and bases of the transistors 184, 186 and 188.

An automatically activated setting-mode selecting device comprises a changeover switch S$_{11}$ for selective control of application of the outputs of the manually operable and automatic film speed setting circuits to the comparator 196, a relay with a coil 180 connected to all of the three sensing contacts 26, 28 and 30 through respective reverse current preventing diodes 202, 204 and 206 upon energization to cause movement of the switch S$_{11}$ from its "a" to its "b" position where the output of the automatic setting circuit is introduced to the electronic switching circuit 196, 198 for an electromagnet 200, a first transistor 172 with its collector connected to the timing capacitor 170 and with its emitter grounded, a second transistor 178 with its collector connected both to the base of the first transistor 172 and to the positive bus through a resistor, and a diode 174 connected between the base and emitter of the first transistor 172 to perform the same function as that of the diodes 190, 192 and 194. The display element 176 with its control switch S$_1$ of FIG. 3 is connected in parallel with the coil 180.

With a film cartridge having a marker 2, 4 loaded on the contacts 24 and 28, when a main switch S$_8$ is closed, the power supply control transistor 154 is rendered conducting and the setting-mode selecting circuit is actuated so that the second transistor 178 is turned on and the first transistor 172 is turned off, thereby the manually operated film speed setting circuit 168 and 170 is rendered ineffective, while the coil 180 is energized to set the switch S$_{11}$ to "b" position. During the aforementioned preparatory transportation of the film for which the switch S$_1$ of FIG. 3 is closed, the light-emitting diode 176 is energized, informing the operator of the fact that the film speed is to be automatically set. At the same time, the electromagnet 200 is energized to maintain the rear shutter curtain in the cocked position.

Upon depression of the shutter button to the first stroke, a switch S$_9$ is closed, causing the operational amplifier 162 to produce an output voltage dependent upon the object brightness level and the preselected diaphragm aperture value (the full open aperture F value of the lens and the correction factor). This output if once stored on the capacitor 164. Upon further depression of the shutter button to the second stroke, the front shutter curtain starts to run down and at the same time the switch S$_{10}$ is moved to "b" position, causing the voltage stored on the capacitor 164 to appear at the output of the operational amplifier 166.

As the transistor 186 has been turned on to select the timing capacitor 182b for constituting a timing circuit together with the resistor 183, this timing circuit starts to generate at the time of the second stroke a time variable voltage which reaches the reference voltage level of the comparator 196 during an interval of time dependent upon the film speed and the output of the operational amplifier 162. Upon attainment of this trigger level, the comparator 196 changes its output from negative to positive voltage, thereby the electromagnet 200 is de-energized with simultaneous occurrence of running down movement of the rear shutter curtain.

In the case of a conventional film cartridge, because of the occurrence of no connection between the contact 24 and any one of the contacts 26, 28 and 30, the transistor 178 remains in the non-conducting state so that the closure of the switch S$_9$ actuates the transistor 172 for conduction to render the timing circuit 168 and 170 operative, and further the switch S$_{11}$ is retained in "a" position. Upon occurrence of the second stroke of depression of the shutter button, the timing capacitor 170 is charged from the output of the operational amplifier 166. When the voltage on the capacitor 170 has reached the trigger level for the comparator 196, the electromagnet 200 is de-energized, causing the rear shutter curtain to run down.

Figure 6:
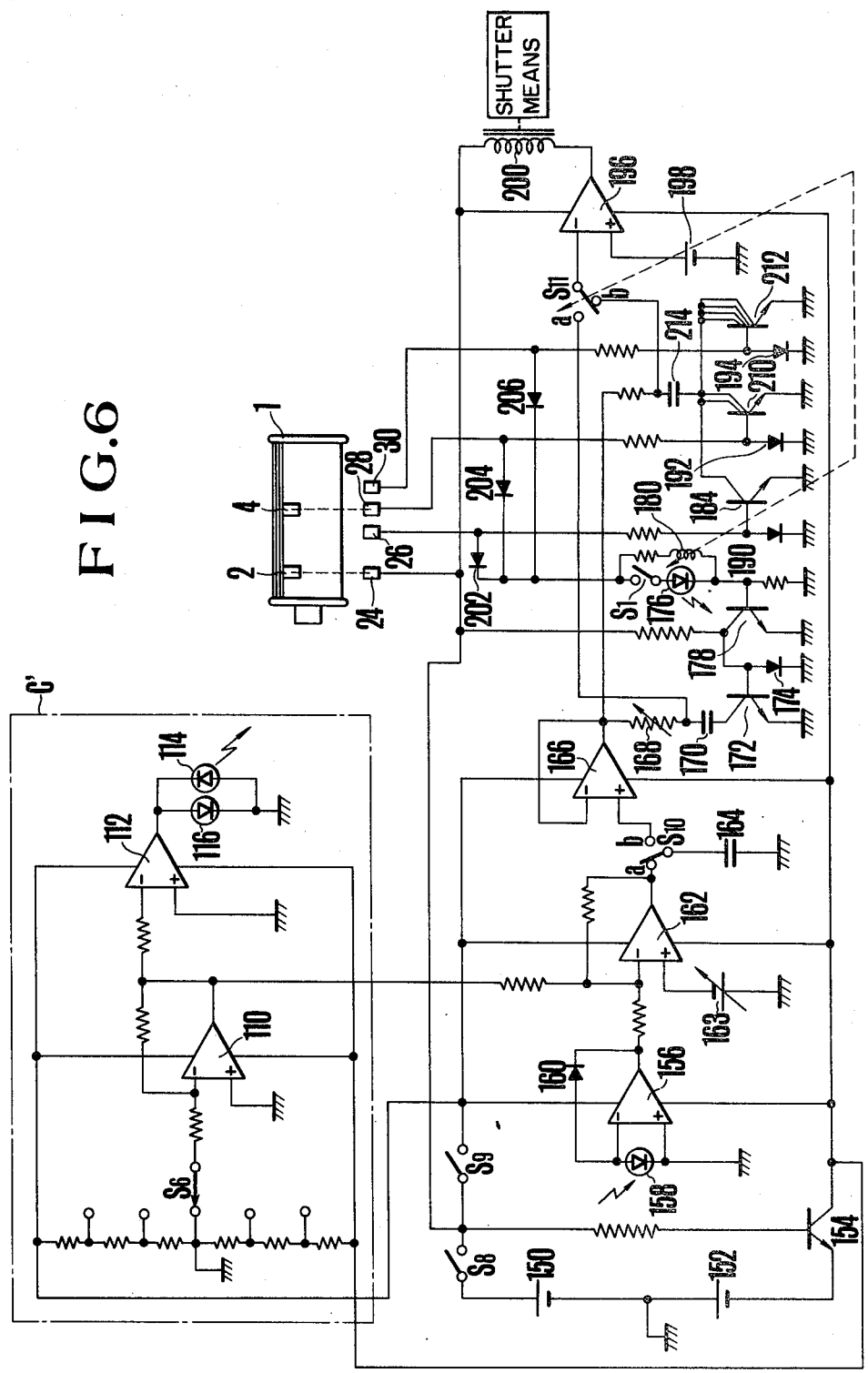
FIG. 6 is an electrical circuit diagram showing an example of modification of the automatic film speed setting circuit of FIG. 5.

FIG. 6 shows an example of variation of the automatic film speed setting circuit of FIG. 5. Instead of using three timing capacitors, use is made of a single timing capacitor 214 as connected between the resistor 183 and a common lead of the collectors of the three switching transistors 184, 210 and 212. Of these transistors, the transistors 210 and 212 are of the multi-collector type and characterized in that when a base current equivalent in intensity to that of the transistor of the single collector type 184 is given, a collector current equal in intensity to an integer number of times that of the transistor 184 can be retracted. As the transistors 184, 210 and 212 are adopted for film speeds of ASAs 200, 400 and 800 respectively, the ratio of the intensities of their collector currents for the equivalent base current is adjusted as: 1:2:4. They operate in the dynamic range of response as adjusted by respective diodes 190, 192 and 194. When an ASA sensitivity signal from the marker is sensed by the contact 24 and any one of the other contacts 26, 28 and 30, a corresponding one of these transistors 184, 210 and 212 is selected for conduction, thereby a charging current dependent upon the given film speed is allowed to flow through the timing resistor to the capacitor 214. It will be appreciated that, whilst FIG. 5 example of the embodiment differentiates the capacitance values of the capacitors 182a, 182b and 182c in setting different film sensitivities, FIG. 6 example of the embodiment differentiates the intensitites of the charging current flowing to the common timing capacitor 214 in setting different film sensitivities. The other portions of the circuit of FIG. 6 are the same as those of FIG. 5 and therefore, the detailed description thereof is omitted here.

Figure 7:
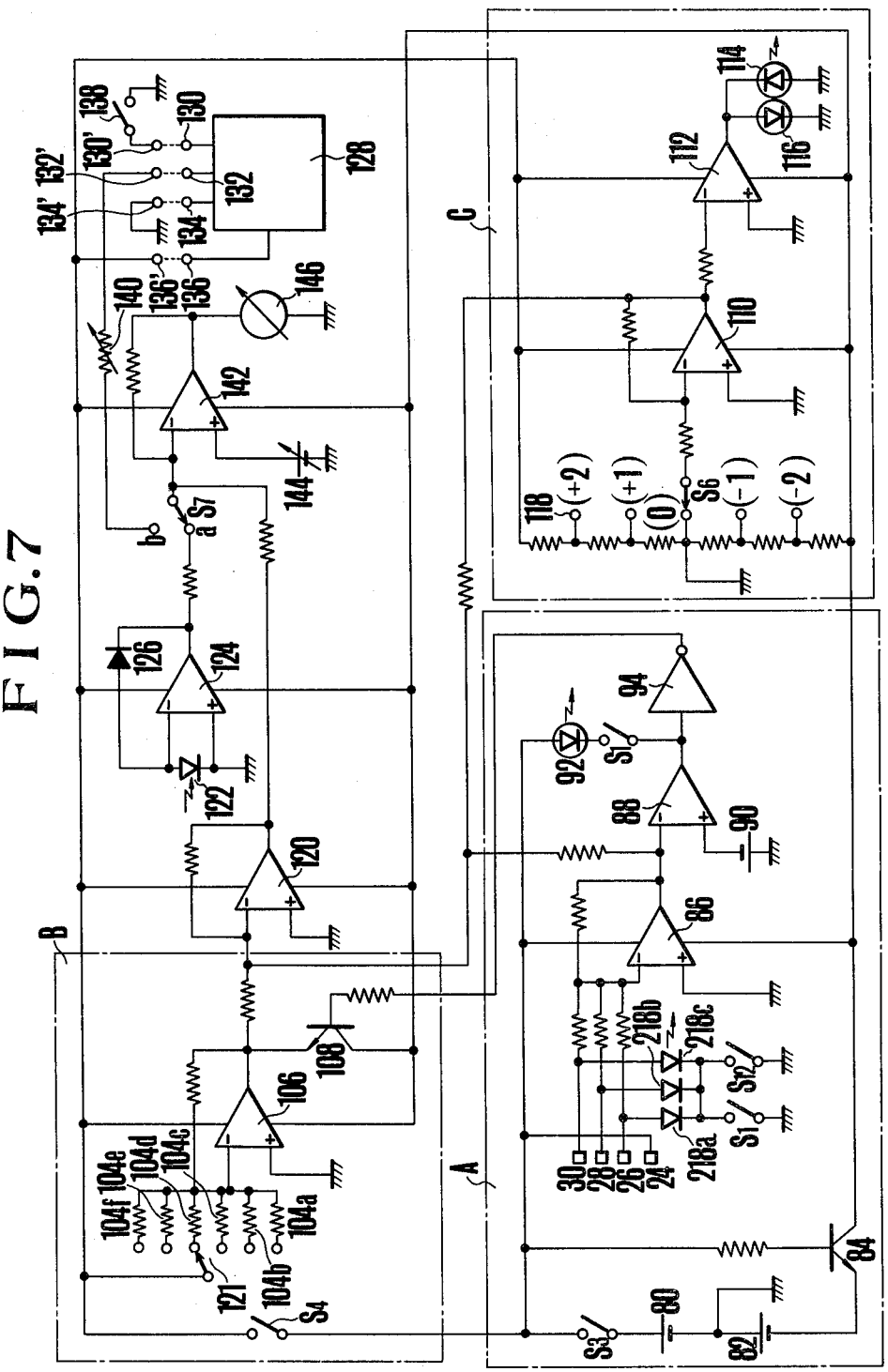
FIG. 7 is an electrical circuit diagram of an example of a display device comprising three indicators arranged in the circuit of FIG. 4 upon insertion of a film cartridge having a marker to be selectively lighted up.
Figure 8:
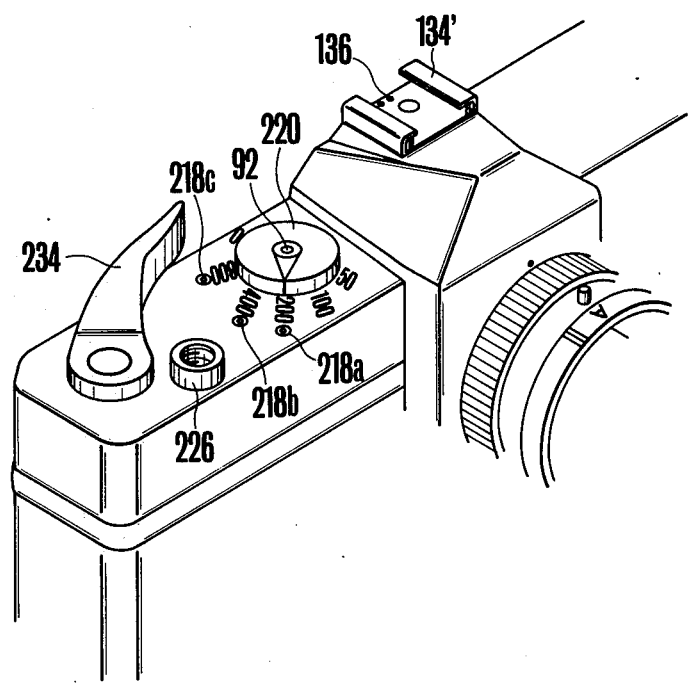
FIG. 8 is a fragmentary perspective view of a camera housing having the indicators of FIG. 7 positioned in alignment with respective graduations on a film speed scale cooperative with a film speed dial.

In order that the operator is made remember of what film speed has been automatically set after the cartridge with the marker was loaded in the camera, the system of FIG. 4 may be associated with a display device as shown in FIGS. 7 and 8, wherein the same reference characters have been employed to denote the similar and like parts to those shown in FIG. 4. This display device is constructed as comprising three light-emitting diodes 218a, 218b and 218c connected at their anodes to the respective sensing electrical contacts 26, 28 and 30 and at their cathodes by way of a common lead to the circuit earth through the parallel-connected switches $S_1$ and $S_{12}$ as shown in FIG. 7, the latter switch $S_{12}$ being arranged to be closed when a battery check button not shown is depressed, and arranged in alignment with respective stationary film speed indicia 200, 400 and 800 adjacent the rear ends thereof upon energization to be visible from the outside of the camera housing as shown in FIG. 8.

As shown in FIG. 8, on the top panel of the camera housing of a single lens reflex camera, there is provided a manually operable ASA sensitivity or film speed setting dial 220 which carries an index mark and at the center of the area of which is positioned the light emitting diode 92. The shutter button and film winding lever are indicated at 226 and 224 respectively. When an Auto-film having an ASA sensitivity of 200 has been loaded in the camera, that of the light emitting diodes 218 which is aligned with the index "400," namely, the diode 218b is lighted on despite of the fact that the film speed dial 220 is left unchanged from the illustrated position for ASA 200. During the preparatory transportation of the film in vain, therefore, the operator is informed of a fact that the automatically set film speed in question is ASA 200. Further, when the battery check button is operated, this display can be established even after the switch $S_1$ has been opened, in other words, during the subsequent advancements of the film for exposure purposes.

When a conventional film cartridge has been loaded in the camera, lighting of any one of the display diodes 218a, 218b, 218c and 92 does not occur even when either the preparatory transportation of the film, or the depression of the battery check button is performed. For this reason, the possibility for the operator of overlooking the necessary manipulation of the film speed dial 220 can be minimized.

Whilst the example of the display device shown in FIGS. 7 and 8 has been described as applied to the single lens reflex camera having the shutter preselection automatic exposure control, the present invention can be also applicable to other types of camera including middle class one which is characterized by having a range finder.

Figure 9:
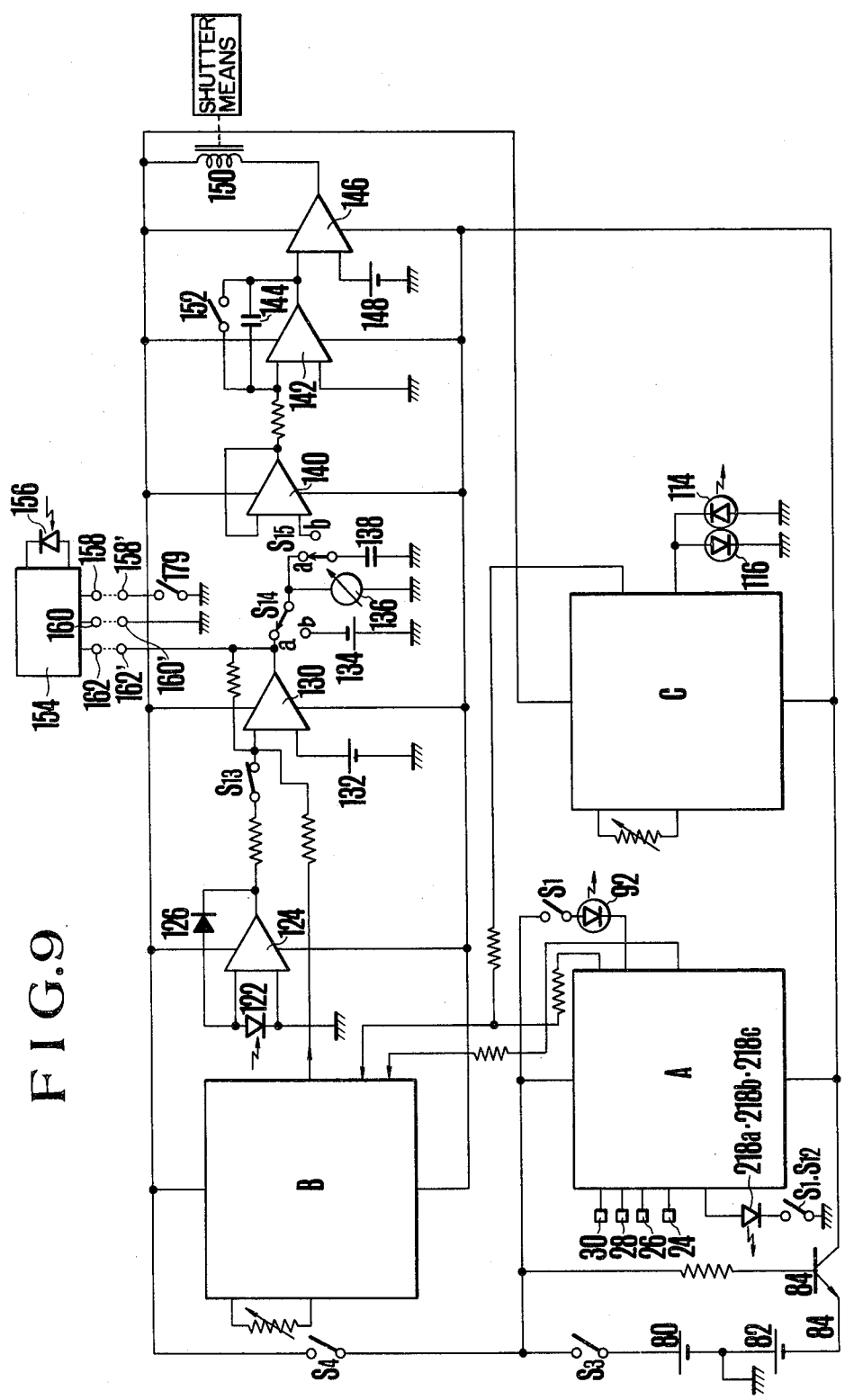
FIG. 9 is an electrical circuit diagram, partly in block form, of another example of the display device associated with a diaphragm preselection automatic shutter control circuit.

FIG. 9 shows another example of application of the display device to a single lens reflex camera having a diaphragm preselection automatic exposure control circuit. This circuit includes three blocks A, B and C identical with those of FIG. 4 and is different from that of FIG. 4 in the use of parts having larger reference numerals than 126. The voltages at the outputs of the light level sensing circuit 122, 124 and 126, a combination of blocks A and C, or B and C, and a variable voltage source 132 for setting the preselected diaphragm aperture value (and the F-number of the lens and correction factor) are combined in an operational amplifier 130, provided that a switch $S_{13}$ is closed for daylight photography. For flash photography, a switch $S_{14}$ is set in its "b" position where a fixed voltage source 134 is connected to the input stage of an exposure meter 136, cooperative with a shutter speed scale, in this instance, while the output of the operational amplifier 130 is introduced into a control circuit for a stroboscopic lamp in a photo-flash unit 154 through a terminal 162'-and-terminal 162 connection, thereby the voltage level to which a storage capacitor for the stroboscopic lamp is to be charged is adjusted in accordance with the film speed and the combined exposure factors set in the variable voltage source 132. The fixed voltage source 134 provides a particular shutter speed suited for flash photography. A switch $S_{15}$ is cooperative with a shutter release actuating member to be movable between "a" and "b" positions. In the "b" position, the once stored shutter speed on a capacitor 138 is applied to a buffer circuit for change of impedance. An operational amplifier 142 and a timing capacitor 144 constitute a Miller integrating circuit. Responsive to an input voltage equal to or larger than a reference voltage set in a variable voltage source 148, a comparator 146 changes its output from a negative to a positive level at which an electromagnet 150 for controlling the period of actuation of the shutter is de-energized.

The photo-flash unit 154 further includes a photosensitive element 156 such as a silicon photo-cell arranged to receive light coming from an object to be photographed with flash illumination, and additional two interconnection terminals 158 and 160 arranged to be brought into contact with terminals 158' and 160' when the photo-flash unit 154 is attached to the camera.

When a daylight exposure is to be made, the operator has to close the switch $S_{13}$ and to set the switch $S_{14}$ in "a" position. As the operational amplifier 130 produces an output representative of the combined film speed, diaphragm control factors and object brightness level, the deflected position of the pointer of the meter 136 indicates a proper shutter speed. This shutter speed is memorized in the form of a voltage on the capacitor 138. Upon depression of the shutter button from the first to the second stroke, the shutter starts to open with simultaneous movement of the switch $S_{15}$ to its "b" position at which the timing capacitor 144 starts to be charged at a ramp dependent upon the output voltage of the memory capacitor 138. When the voltage on the capacitor 144 has reached the trigger level for the comparator 146, the electromagnet 150 is de-energized causing the rear shutter curtain to run down to terminate the duration of the shutter time.

When a flash exposure is to be made, the operator has to turn the switches $S_{13}$ and $S_{14}$ to the open and "b" positions respectively. As the photo-flash unit 154 has been mounted on the camera with the terminals 158, 160 and 162 of the photo-flash unit 154 connected with the terminals 158', 160' and 162' of the camera, the main capacitor for the stroboscopic lamp is charged to a level dependent upon the output of the operational amplifier 130. When a shutter release is actuated, the stroboscopic lamp is fired to illuminate the object being photographed. When the illuminance sensed by SPC 156 has reached a predetermined level, the flashing is stopped to result in making a correct exposure of the film. In this case, the flash exposure time is previously adjusted to insure that the entire area of the film frame can be exposed uniformly.

Figure 10:
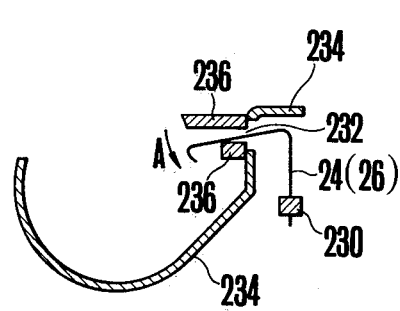
FIGS. 10 to 13 are sectional views of two different examples of construction and arrangement of film speed marker sensing electrical contacts provided in the camera housing to extend into a cartridge chamber thereof.
Figure 11:
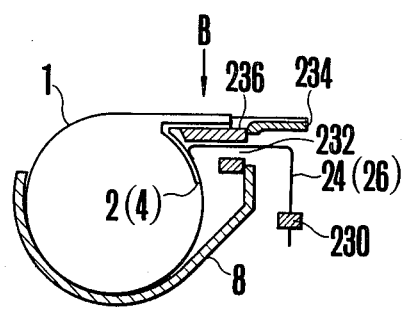
Figure 12:
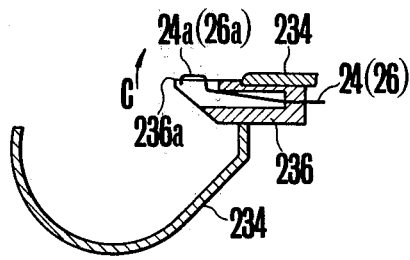
Figure 13:
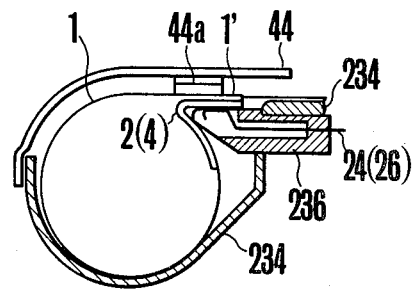
Figure 14:
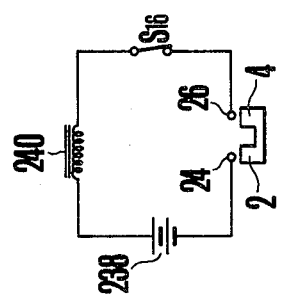
FIG. 14 is a schematic view of an electromagnet control circuit having the electrical contacts of FIGS. 10 to 13.
Figure 15:
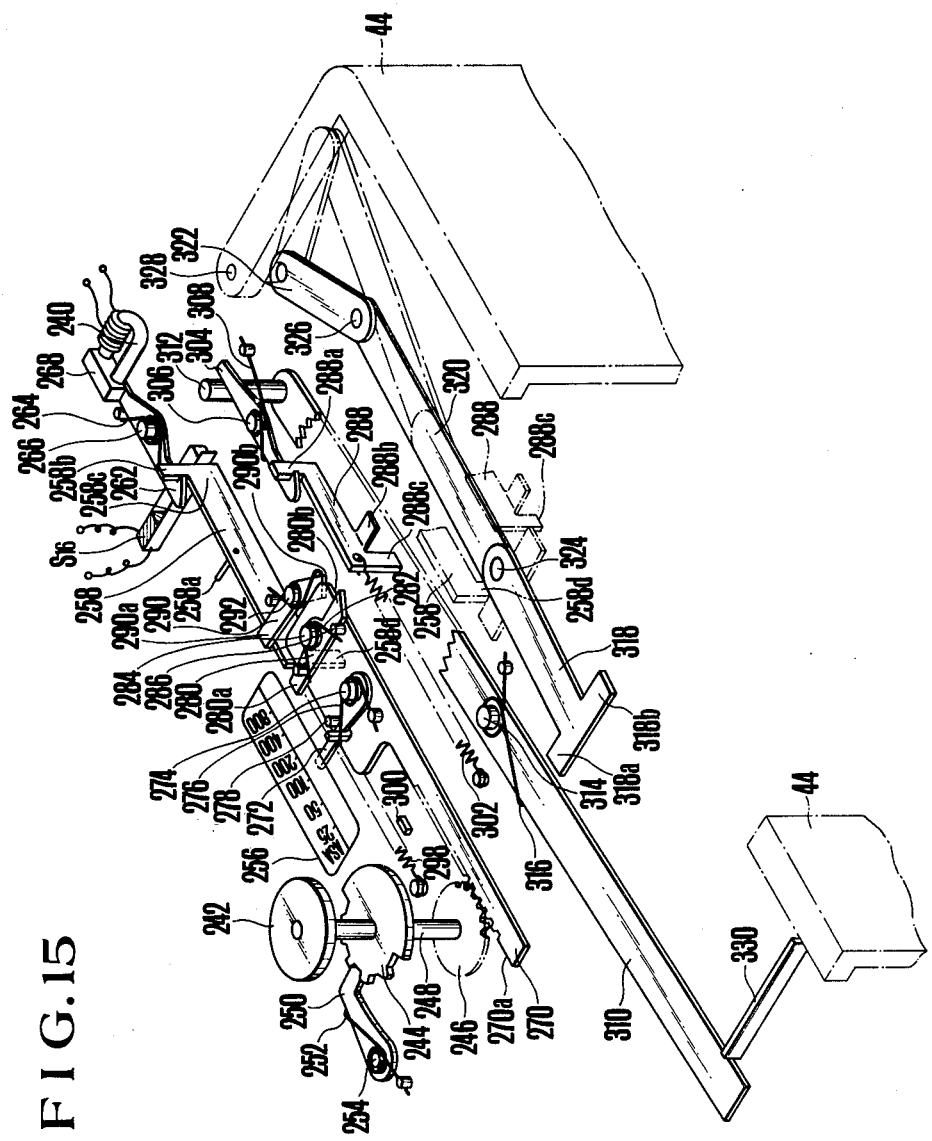
FIG. 15 is an exploded perspective view of another embodiment of the present invention in the form of a manually operable or automatic film speed setting scanning mechanism, with the electromagnet of FIG. 14 serving as an actuator for the automatic setting.

FIGS. 10 to 18 show another embodiment of the present invention in the mechanical form adapted to be capable of automatic setting of film speed at only one particular value. In FIGS. 10 and 11 there is shown an example of construction and arrangement of a marker sensing mechanism particularly suited for use in this embodiment. This mechanism comprises a pair of resilient electrical contact members 24 and 26 extending from a stationary support 230 through an opening 232 which is provided through the wall of the film cartridge chamber 234 and a cartridge abutment 236 into the cartridge chamber and self-biased in a direction indicated by an arrow A, so that when a film cartridge is loaded in the chamber as shown in FIG. 11, the contact members 24 and 26 are moved against the sprinding force thereof, while being maintained in sufficient contact with the respective parts of the marker 2 and 4. When the back cover 44 of the camera is closed, the cartridge 1 is pressed against the abutment 236 as a force is applied thereto in a direction indicated by an arrow B. In FIGS. 12 and 13 there is shown another example of the marker sensing mechanism comprising a pair of resilient electrical contact members 24 and 26 arranged to be movable within a space provided in the cartridge abutment 236 and self-biased in the opposite direction indicated by arrow C to that shown in FIG. 10 to extend over the upper surface 236a of the abutment 236, so that when the cartridge 1 is seated in the chamber with the back cover 44 closed, the marker 2 and 4 is brought into sufficient contact with the electrical contact members 24 and 26 and this relation is secured in good safety by the presser 44a which presses the film exit 1' against the abutment 234. An electrical circuit for these contact members 24 and 26 is shown in FIG. 14 including a solenoid 240 of an electromagnet which constitute part of a manually operable or automatic film speed setting mechanism shown in FIGS. 15 to 18.

This mechanism includes a film speed dial 242 arranged to be operable from the outside of the camera housing not shown, a position adjusting disc 244 fixedly connected to a common shaft 248 of the film speed dial 242 and having a number of radial recesses cooperative with a click lever 250 upon reception of the latter at its pawl to permit selection of a corresponding one of discrete film speed values as indicated at 256, and a gear 246 fixedly connected to the bottom end of the shaft 248 and meshing with a rack 270a formed in a portion of a manual setting control plate 270. Pivotally mounted on the plate 270 are an index lever 272 of rectangular section and a two-armed lever 280 which laterally extends at one end 280a into the path of movement of a setting-mode changeover slide 258 so that when the electromagnet 240 with its control circuit shown in FIG. 14 is energized to attract an armature 268 with simultaneous occurrence of clockwise movement of a latching lever 262 about a pivot pin 266 against the force of a spring 264, the slide 258 is moved under the action of a spring 298 from the position of FIG. 15 to a position of FIG. 17, where a lug 258d downwardly extending from the slide 258 abuts against a stopper 300, while causing the index lever 272 to be retracted from the field of view of the film speed display 256 and also causing the control lever 280 to be retracted at the other end 280b from the path of movement of a scanning member 288, as shown in FIG. 17.

Referring again to FIG. 15, the film speed setting mechanism further includes an actuating lever 310 pivotal about a pin 314 and biased by a spring 316 in a counter-clockwise direction, a rod 330 arranged upon closure of the back cover 44 to strike the actuating lever 310 at one end, with the result that the scanning slide 288 starts scanning operation as a latching lever 304 therefor is turned clockwise about a pivot pin 306 by a pin 312 which is acted on the tail of the latching lever 304. When the back cover 44 is opened, a charging mechanism is operated so that the scanning member 288 and the changeover slide 258 are simultaneously reset in the respective charged positions shown in FIG. 15. This charging mechanism comprises a T-shaped lever 318 having two arms 318a and 318b arranged upon charging operation to push the scanning and changeover slides 288 and 258 in driving engagement with the downwardly extending projections 288c and 258d thereof respectively, an intermediate lever 320 pivotally connected at one end to the T-shaped lever 318 by a pin 324, the opposite end of which is movably connected by a pin 326 to the free end of a driving lever 322. The opposite end of the driving lever 322 is fixedly connected to the back cover 44 through a common pivot shaft 328.

Figure 17:
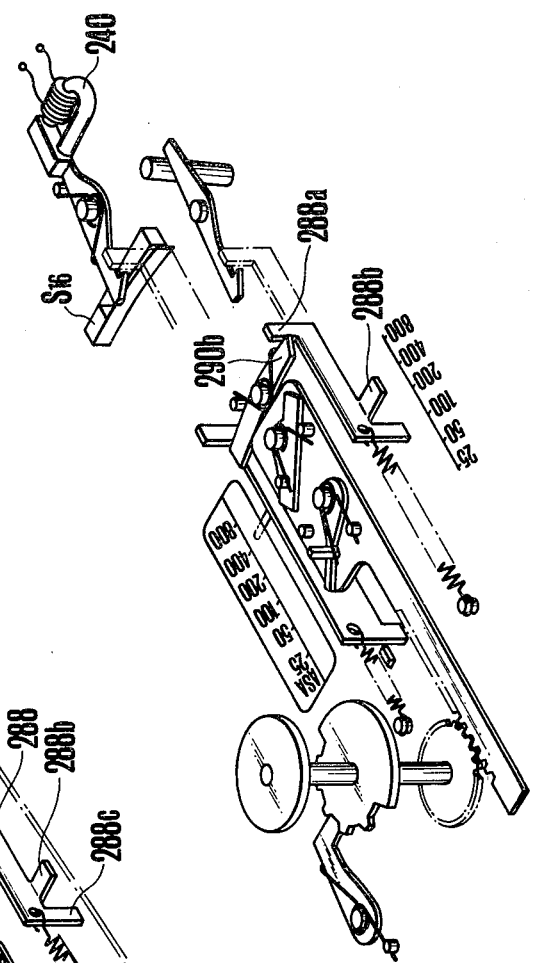
FIG. 17 is a similar view wherein a particular film speed is automatically selected with a scanning member remaining in a latched position.
Figure 18:
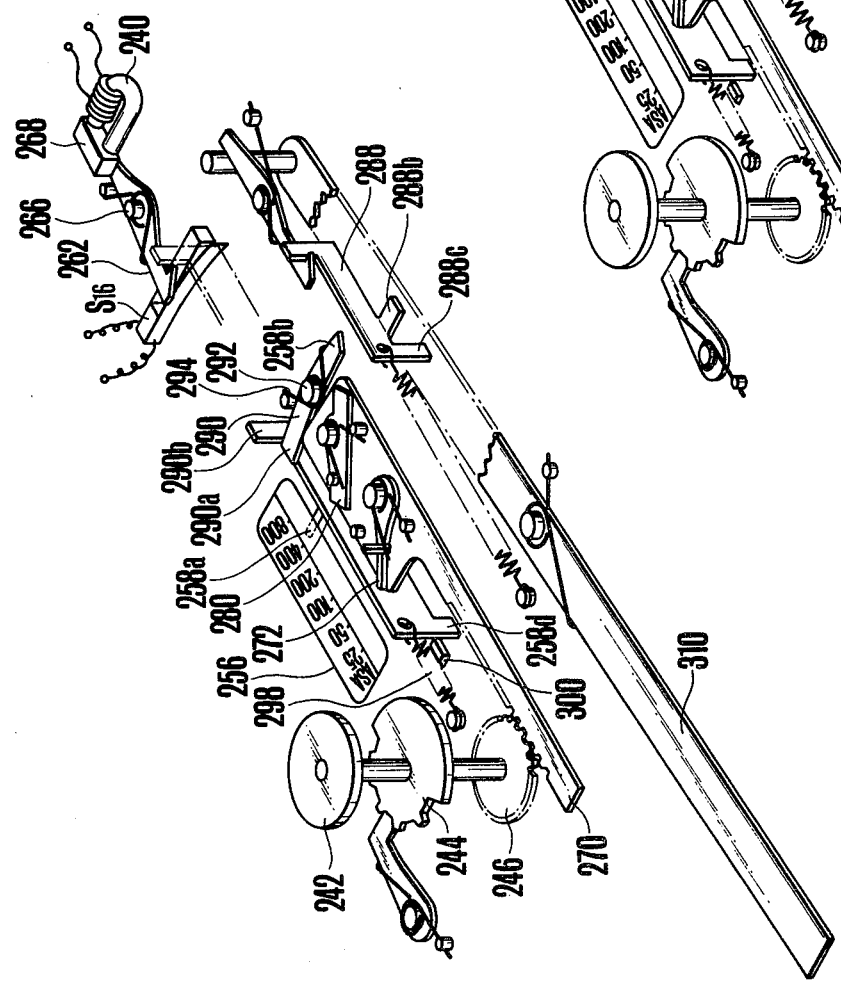
FIG. 18 is a similar view wherein the automatic setting of FIG. 17 is scanned.

The mode changeover slide 258 fixedly carries an index bar 258a of round section arranged upon selection of automatic setting to enter the field of view of the film speed display 256 and to stay in registry with a particular indicium, in this instance, ASA 400 as shown in FIGS. 17 and 18. When the slide 258 nears the terminal end of running down movement, an automatic film speed setting control lever 290 is acted on through the connection at one end 290a thereof with an upwardly extending projection 258b of the slide 258, finally assuming a position where the opposite end 290b of the lever 290 extends into the path of movement of the scanning slide 288 at the same point as that at which the manual setting control lever 280 would otherwise take place when the film speed dial 242 is turned to place the index 272 in registry with the indicium "400."

Figure 16:
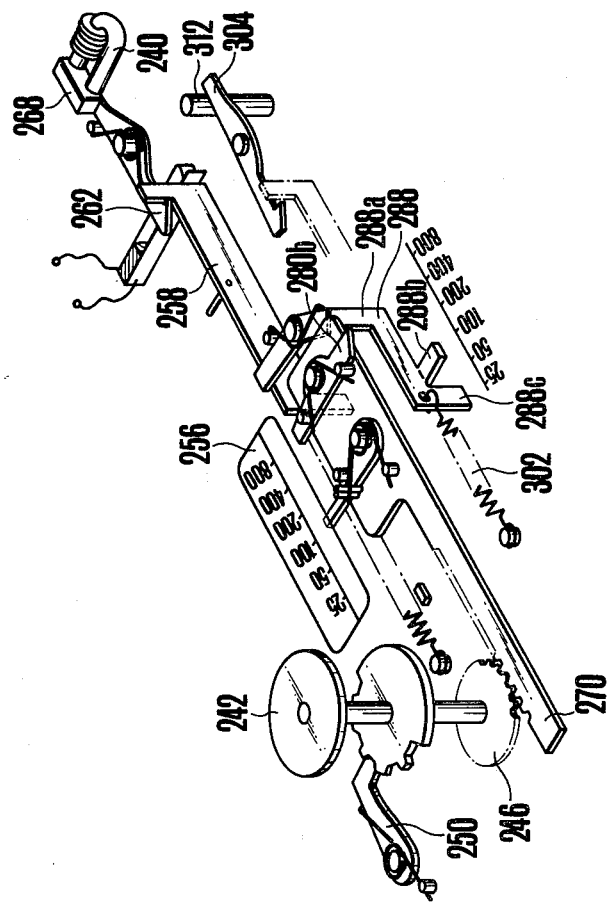
FIG. 16 is a similar view wherein a manually selected film speed is scanned.

The operation of the mechanism of FIGS. 15 to 18 is as follows. When a conventional film cartridge having no marker 2 and 4 is intended to be used or already inserted into the chamber as shown in FIGS. 11 or 13, the operator will turn the dial 242 to place the index 272 in registry with the one of the indicia which is coincident with the given sensitivity of film in the cartridge, in this instance, ASA 100. As the back cover 44 is turned about the pin 328 in a direction toward closure, the charging mechanism is moved from the position shown by phantom lines to the position shown by the solid lines in FIG. 15. When the cover 44 nears the terminal end of closing movement, the sensing rod 330 is pushed inwards, causing clockwise movement of the actuating lever 310 about the pivot pin 314 against the force of the spring 316 which in turn causes clockwise movement of the latching lever 304 against the force of the spring 308, thereby the scanning slide 288 is disengaged from the latching lever 304. The position of the manual setting control lever end 280b is scanned by the scanning slide projection 288a as shown in FIG. 16, and the scanning result is introduced into an automatic exposure control circuit not shown, as, for example, a variable resistor of the circuit is operated by a projection 288b of the scanning slide 288 to translate the amount of movement of the scanning slide 288 into information representative of the adjusted value of film speed.

As the circuit of FIG. 14 remains open at the electrical contacts 24 and 26, the mode changeover slide 258 is not operated and therefore the automatic setting control lever 290 has no effect on the scanning result.

After the completion of exposure of all the film, the operator will rewind the film into the cartridge and then open the back cover 44. During this opening operation, the T-shaped lever 318 is driven for rightward movement along with the scanning slide 288 against the force of the spring 302 until the scanning slide 288 is latched by the lever pawl 288a.

Now assuming that a film cartridge having a marker representative of a sensitivity of ASA 400 is inserted into the chamber, then the circuit of FIG. 14 is closed to energize the solenoid of the electromagnet 240 from a battery 238, thereby the latching lever 262 is turned about the pin 266 in a clockwise direction against the force of spring 264, thus permitting the mode changeover slide 258 to be driven for movement to left by the action of the spring 298. During the movement of the slide 258, the manual setting control lever 280 is first turned about a pin 284 against the force of a spring 282 by the forward end of the slide 258 with the resulting position of the lever arm 280b being out of the path of movement of the scanning slide 288, then the index lever 272 is turned about the pin 274 in a counterclockwise direction against the force of the spring 276 with the resulting position of the index bar 272 being moved away from the field of view of the display 256, and then the automatic setting control lever 290 is turned about a pin 294 in a counterclockwise direction against the force of a spring 292 by the projection 258b of the slide 258 with the resulting position of the lever end 290b being located in the path of movement of the scanning slide 288, as the slide 258 is stopped in engagement at its lug 258d with the stopper 300 as shown in FIG. 17. At the start of movement of the slide 258, a switch S16 is opened to de-energize the solenoid 240, thus the wasteful consumption of electrical energy of the battery 238 can be minimized.

Upon closure of the back cover 44, the scanning slide 288 is released from the latching connection with the lever 304, and then gets stopped in abutment at its upward projection 288a against the lever 290, thus the scanning result represents the particular film speed of ASA 400, as shown in FIG. 18.

After the completion of exposure of the film, the operator will rewind the film into the cartridge 1, and then open the back cover 44 to remove the cartridge from the chamber. At this time, the changeover and scanning slides 258 and 288 are simultaneously returned to the initial positions of FIG. 15 where the manual setting control lever 280 is rendered effective again for ASA 100.

It will be seen from the foregoing that the automatic setting of a particular film speed value prevails over the manual setting of any film speed value, while the once adjusted manual setting is preserved. As the percentage of films of ASA 100 used in ordinary photography is considerably high, it is very convenient to automatically reset the film speed setting mechanism to a position for ASA 100 after a film having a special sensitivity, for example, ASA 400 is removed from the camera. Although the present invention has been described in connection with a film cartridge having a marker representative of ASA 400, it is of course possible to make changes in the above mechanism. For example, in order to automatically set a different film speed from ASA 400, the setting control lever 290 and the index bar 258a may change their positions relative to the scanning slide 288 and the film speed scale in the display 256 respectively.

Figure 19:
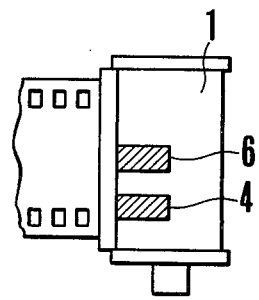
FIG. 19 is a side elevational view of a film cartridge of the type having a marker which indicates a particular film speed, for example, ASA 400.
Figure 20:
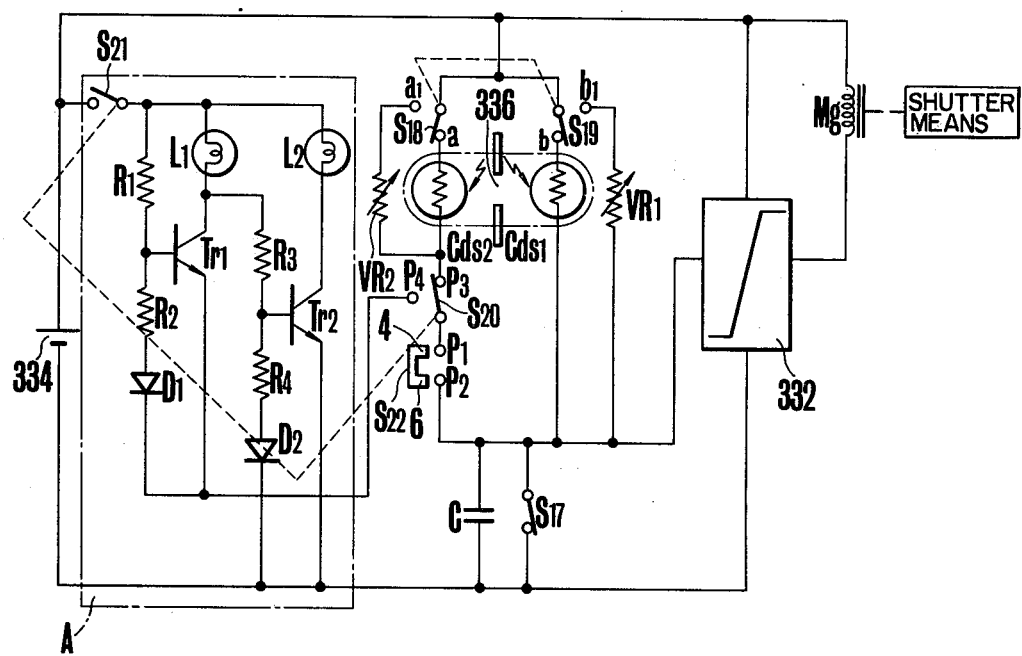
FIG. 20 is a schematic diagram of still another embodiment of the present invention as applied to a daylight and flash exposure time control circuit selectively operating with two different film speeds of which the higher one may be that of FIG. 19 and including a battery voltage checking and film speed display circuit.
Figure 21:
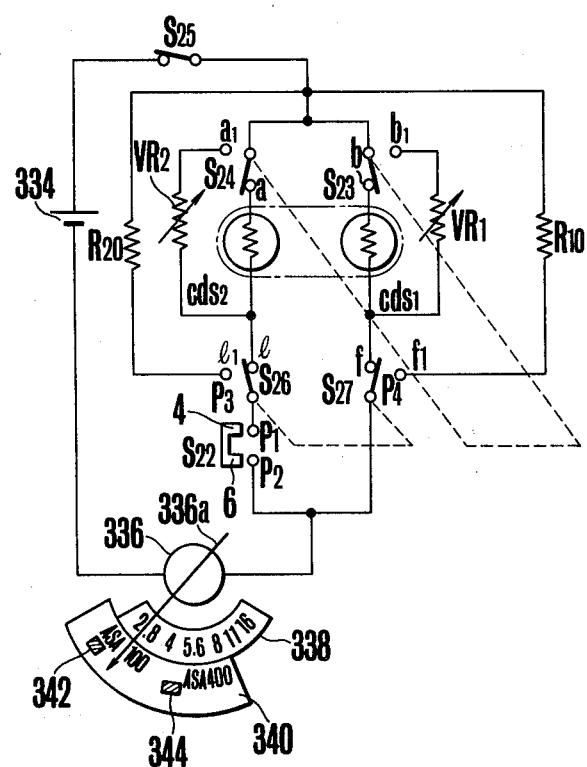
FIG. 21 is a schematic diagram of an example of a modification of the circuit of FIG. 20 with a moving coil instrument adapted to control the camera diaphragm and to display the out-of-range battery voltage and the selected film speed.

FIGS. 19 to 21 show still another embodiment of the invention in which a cartridge for a higher film sensitivity, for example, ASA 400 is provided with a marker in the form of two electrically conductive patches 4 and 6 as shown in FIG. 19, while cartridges for lower film sensitivities are of the conventional type having no marker. An additional feature of this embodiment is that whether the sensitivity of the film loaded in the camera is higher or lower can be made to display at any time as desired with simultaneous occurrence of display of whether the actual voltage of the electrical power source is above a satisfactory operating level. As an example of such display means, use is made of two lamps in a circuit of FIG. 20. By taking into account the prevailing practice that the exposure meter is utilized as a battery checker, the film speed display means may be constructed in the form of an indicating plate arranged adjacent the exposure value scale for the exposure meter as shown in FIG. 21.

FIG. 20 shows an electrical circuit diagram of the just mentioned embodiment of the present invention applied to a shutter speed control circuit for daylight and flash photography and operating with automatic selection of either one of two different film speed values, for example, ASA 100 and ASA 400. The circuit of FIG. 20 includes four timing circuits and a switching circuit 332 selectively responsive to the outputs of the timing circuits for energizing and de-energizing the solenoid of an electromagnet Mg controlling shutter closing operation of the rear curtain. The four timing circuits have a common capacitor C across which is connected a switch $S_{17}$ arranged to be opened when the front shutter curtain starts to run down. A first photoconductive cell of cadmium sulfide CdS-1 constitutes part of the first timing circuit, is positioned to receive light coming from an object to be photographed and entering through a diaphragm aperture opening 336 and designed to have a light response characteristic suited for daylight photography by use of a film having the lower sensitivity of ASA 100. A second photo-conductive cell of cadmium sulfade CdS-2 is connected in parallel with the first photoconductive cell CdS-1 to constitute part of the second timing circuit of time constant suited for daylight photography by use of a film of the higher sensitivity of ASA 400 and is positioned to receive light entering through the common diaphragm aperture opening 336 of the first photoconductive cell CdS-1. The first and second photoconductive cells CdS-1 and CdS-2 may be constructed in the form of a single element having four terminals as indicated by a closed dashed line. A first variable resistor $VR_1$ is arranged to cooperate with a distance adjusting ring of the camera and constitutes part of the third timing circuit of time constant suited for flash photography by use of the film of ASA 100. A second variable resistor $VR_2$ when connected in parallel to the first variable resistor $VR_1$ constitutes part of the fourth timing circuit of time constant suited for flash photography by use of the film of ASA 400. In order to manually or automatically select one of the four timing circuits for cooperation with the switching circuit 332, there are provided an exposure mode changeover switch element assembly $S_{18}$ and $S_{19}$, the first switch element $S_{18}$ having one pole connected to a positive bus and having two throws "a" and "$a_1$" connected respectively to the second photoconductive cell CdS-2 and the second variable resistor $VR_2$ and the second switch element $S_{19}$ having one pole connected to the positive bus and having two throws "b" and "$b_1$" connected respectively to the first photoconductive cell CdS-1 and the first variable resistor $VR_1$, and a marker responsive switch $S_{22}$ having two throws $P_1$ and $P_2$ corresponding to the marker sensing electrical contacts 24 and 26 of the foregoing embodiments of the invention and connected in a common lead of the second photoconductive cell CdS-2 and the second variable resistor $VR_2$ to the timing capacitor C.

A display circuit enclosed in a dashed line block A comprises a first indicator lamp $L_1$ for the higher sensitivity of film connected at one end of a filament thereof to the positive terminal of an electrical power source or battery 334 through a switch $S_{21}$ which is arranged to cooperate with a battery check button not shown and at the opposite end thereof to a collector of a transistor $Tr_1$ with its base connected to a point on connection between resistors $R_1$ and $R_2$ which are connected between the positive and negative terminals of the battery 334 by way of a lead including a diode $D_1$, a switch $S_{20}$, the switch $S_{22}$ and the switch $S_{17}$, a second indicator lamp $L_2$ for the lower sensitivity of film connected at one end of a filament thereof to a collector of a transistor $Tr_2$ with its base connected to a point on connection between resistors $R_3$ and $R_4$ which are connected between the first lamp $L_1$ and the negative terminal of the battery 334 by way of a lead including a diode $D_2$.

The operation of the circuit of FIG. 20 is as follows: When a daylight exposure is to be made using a film of ASA 100, the operator will first turn the exposure mode changeover switches $S_{18}$ and $S_{19}$ to their "a" and "b" positions. The loading of the film cartridge having no marker 4 and 6 does not lead to the closure of the switch $S_{22}$ so that the second photoconductive cell CdS-2 remains ineffective, in other words, the first timing circuit is ready for operation. Upon actuation of a shutter button, the count switch $S_{17}$ is opened to start charging of the timing capacitor C. In an interval of time dependent upon the film sensitivity and the object brightness level, the switching circuit 332 is triggered to de-energize the solenoid of electromagnetic Mg, causing the rear shutter curtain to run down to the exposure aperture closed position.

When a flash exposure is to be made using the film of ASA 100, a photo-flash unit not shown will be attached to the camera with the switch elements $S_{18}$ and $S_{19}$ moves from "a" and "b" to "$a_1$" and "$b_1$" positions respectively by hand or in automatic response to the attachment of the photo-flash unit, thereby the first and second photoconductive cells CdS-1 and CdS-2 are rendered inoperative. Because of the use of the lower film sensitivity, the second variable resistor $VR_2$ has no contribution to the setting of film speed, in other words, the third timing circuit is selected for cooperation with the switching circuit 332.

If the operator depresses the battery check button for the purpose of seeing whether the sensitivity of film used is higher or lower, the switch $S_{21}$ is closed and the switch $S_{20}$ which is assembled with the switch $S_{21}$ as schematically shown by dashed lines is set from "$P_3$" position to "$P_4$" position. As the used film has the lower sensitivity of ASA 100, the first transistor $Tr_1$ remains in the non-conducting state, but the second transistor $Tr_2$ is turned on by the closure of the switch $S_{21}$ so that the second lamp $L_2$ glows. Now assuming that the actual voltage of the battery 334 has fallen below the satisfactory operating level, then the intensity of light of the energized lamp $L_2$ is appreciably weak or zero, thus the operator is informed of the necessity of replacing the battery 334 by new one.

Next, consideration will be given to the case where a film having the higher sensitivity of ASA 400 is contained in a cartridge having the marker 4 and 6 and intended to be used or already inserted into the camera. When the cartridge is inserted into and seated in the chamber to close the switch $S_{22}$, either the second or the fourth timing circuit is selectively rendered operative depending upon whether the operating mode is for daylight or flash photography respectively. In the second timing circuit, the first and second photoconductive cells CdS-1 and CdS-2 are connected in parallel with each other so that the combined resistance value is smaller than that of the first photoconductive cell CdS-1 alone, and therefore the exposure time is shorter than that for the lower sensitivity of film to effect an equivalent exposure. In flash photography, the first and second variable resistors are substituted for the first and second photoconductive cells CdS-1 and CdS-2.

With the film of ASA 400 loaded in the camera, when the battery check button is depressed, the first transistor $Tr_1$ is rendered conducting to energize the first indicator lamp $L_1$ from the battery 334 through the switches $S_{20}$, $S_{22}$ and $S_{17}$, while the second transistor is rendered non-conducting to maintain the second indicator lamp $L_2$ in the de-energized state. If the voltage of the battery 334 is lower than the satisfactory operating level, there will be no light emitted from any of the lamps $L_1$ and $L_2$.

As shown in FIG. 21, the aforesaid display function may be imparted into an exposure meter 336 with its pointer 336a extending across an exposure scale 338, in this instance, diaphragm aperture scale, and a film speed scale 340. The film speed scale 340 consists of two indicia ASA 100 and ASA 400 with respective square areas 342 and 344 positioned adjacent thereto to indicate the lower limit of a satisfactory operating range of the battery 334. For this purpose, the circuit of FIG. 21 includes first and second fixed resistors $R_{10}$ and $R_{20}$ connected at their one ends to the positive terminal of the battery 334 through a switch $S_{25}$ which is arranged to be closed when the shutter button is depressed and at their opposite ends to the winding of the exposure meter 336 through respective switch elements $S_{27}$ and $S_{26}$ which operate in unison as schematically shown by dashed lines to check the battery voltage.

The operation of the circuit of FIG. 21 is as follows: When a daylight exposure is to be made using a film of ASA 100, the exposure mode changeover switch element assembly $S_{24}$ and $S_{23}$ are set in their "a" and "b" positions respectively, while the switch $S_{22}$ remains open because of the lack of the marker 4 and 6, so that only one film speed control element or first photoconductive cell CdS-1 is selectively connected to the exposure meter 336 through the switch element $S_{27}$ thereby the deflected position of the pointer 336a is varied as a function of object brightness. When the battery check button is depressed to turn the switch $S_{27}$ from its "f" to its "$f_1$" position where the first photoconductive cell CdS-1 is cut off from the meter 336 and instead the fixed resistor $R_{10}$ is brought into connection therewith, the pointer 336a is deflected to alignment with indicium ASA 100 as shown in FIG. 21, provided that the voltage of the battery 334 is above the satisfactory operating level. If this voltage has fallen below the aforesaid level, the pointer 336a is deflected to a position beyond the mark 342.

With a film cartridge having the marker 4 and 6 representative of ASA 400 loaded in the camera, when the exposure mode changeover switches $S_{24}$ and $S_{23}$ are set in their "a" and "b" positions and when the battery check button is not depressed, the first and second photoconductive cells CdS-1 and CdS-2 are brought into parallel connection with each other and to series connection with the exposure meter 336 so that the pointer 336a is deflected to a position for a diaphragm aperture value smaller in size by two steps than that which would otherwise occur when the film of ASA 100 is used. When the battery check button is depressed, the switches $S_{26}$ and $S_{27}$ are set from "l" and "f" to "$l_1$" and "$f_1$" positions where the first and second fixed resistors $R_{10}$ and $R_{20}$ are connected in parallel with each other and in series to the exposure meter 336, so that the pointer 336a is deflected to alignment with indicium ASA 400 on the film speed scale 340. If the voltage of the battery 334 is below the satisfactory operating level, the pointer 336a comes to alignment with the square area mark 344.

For flash photography, the switches $S_{24}$ and $S_{23}$ are set to "$a_1$" and "$b_1$" positions, thereby the deflected position of the pointer 336a is varied as a function of the camera-to-object distance, since the variable resistors $VR_1$ and $VR_2$ are adjusted by the distance adjusting ring of the camera.

Figure 22:
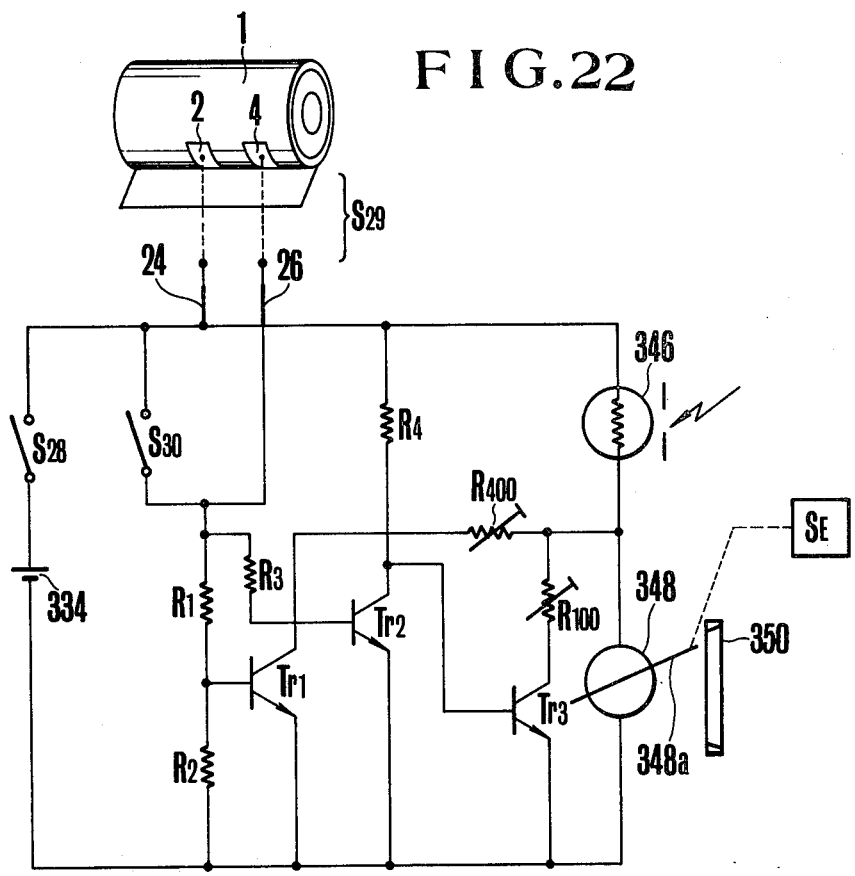
FIG. 22 is a schematic diagram of a light metering circuit having a transistorized switching circuit for automatic selection of either one of the high and low film speeds.

Instead of utilizing different light response characteristics of the photoconductive cells in setting different film speed values it is possible to use different resistance values in combination with an automatically activated selecting circuit by which the resistance values representative of ASA 100 and ASA 400 are selectively introduced into a light metering circuit. An example of such automatic film speed setting control is shown in FIG. 22. A photo-sensitive element 346 and a galvanometer 348 are connected in series to each other and to an electrical power source or battery 334 through a main switch $S_{28}$. The galvanometer 348 has an output member or needle 348a cooperative with an exposure scale 350 (e.g. shutter speed scale, or diaphragm aperture scale), and serving as an actuator for a safety means SE of known construction such that when the needle 348a is deflected to a point beyond a dynamic range of exposure control, shutter releasing the film winding operations are prevented from occurring.

The automatic film speed setting circuit of FIG. 22 comprises two semi-fixed resistors R100 and R400 for ASA 100 and ASA 400 respectively connected at their one ends to a common point on connection between the photo-sensitive element 346 and the galvanometer 348, the opposite ends of which are connected to respective switching transistors $Tr_3$ and $Tr_1$ at their collectors and a marker responsive switch $S_{29}$ having two marker sensing electrical terminals 24 and 26 and connected in parallel with a manually operable film speed setting control switch $S_{30}$ and in series to a voltage divider of resistors $R_1$ and $R_2$ between the positive and negative terminals of the battery 334. Connected to a point on connection between the resistors $R_1$ and $R_2$ is the base of the transistor $Tr_1$ with its emitter connected to the negative bus. The base of transistor $Tr_3$ is connected to the collector of a transistor $Tr_2$ and to the positive bus through a resistor $R_4$. The base of transistor $Tr_2$ is connected through a resistor $R_3$ to a point on connection between the switch $S_{29}$ or $S_{30}$ and the voltage divider $R_1$ and $R_2$, while its emitter is connected to the negative bus.

With a film of ASA 100 loaded in the camera, as the cartridge containing the film has no marker 2 and 4 to open the switch $S_{29}$, the closure of the switch $S_{28}$ does not result in conduction of the transistors $Tr_1$ and $Tr_2$, causing the transistor $Tr_3$ to be turned on, thereby the resistor R100 is selected for cooperation with the photo-sensitive element 346, provided that the normally open switch S30 remains in the open position.

The insertion of a cartridge having a marker 2 and 4 representative of ASA 400 into the camera closes the switch S29, causing the transistors $Tr_1$ and $Tr_2$ to be turned on and then causing the transistor $Tr_3$ to be turned off, thereby the resistor R400 is selected for cooperation with the photosensitive element 346.

Now assuming that the cartridge containing a film of ASA 400 is provided with no marker 2 and 4, when such cartridge is loaded in the camera, the resistor R100 will be selected to result in over-exposure of the film. In order to avoid such misinformation of film speed, it is required that the normally open switch $S_{30}$ be manipulated to be closed prior to making of exposure.

Figure 23:
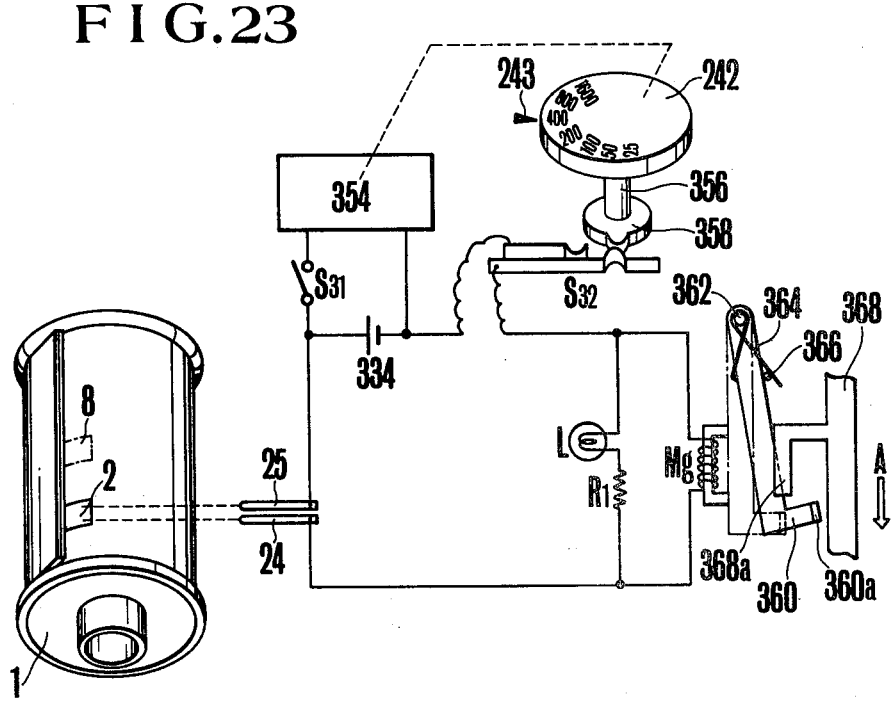
FIG. 23 is a schematic view, partly in block form, of a further embodiment of the present invention with inclusion of a film speed setting monitor and safety device adapted for limitation of automatic setting to only one particular film speed.

FIG. 23 shows an example of application of the aforesaid marker to the avoidance of overlooking the necessary manipulation of the film speed dial, as a large number of film speed values are available thereon. Such a function of the marker is performed by a monitor and safety device which will be described in detail below. This device includes a pair of marker sensing electrical contacts 24 and 25 arranged to be short-circuited by one of the electrically conductive patches 2 and 8 constituting the marker when the cartridge is seated in the chamber within the camera, and connected in an electrical power supply line from a battery 334 to the solenoid of an electromagnet Mg which controls operation of a latching lever 360 in such a manner that when energized the lever 360 is turned about a pivot pin 362 in a clockwise direction against the force of a spring 364 from a solid line position to a dashed line position where a lever pawl 360a stays in the path of movement of an arm 368a extending from an operating member or slide for actuation of a shutter release or film winding mechanism, as the slide 368 is moved in a direction indicated by an arrow A, and a control switch $S_{32}$ connected in the common power supply line of the electrical contacts 24 and 25 and arranged to detect a particular switched position in this instance, for ASA 400, of the film speed dial 242 having indicia 25, 50, 100, 200, 400, 800 and 1600 cooperative with a stationary index 243. Information of film speed is introduced from the film speed dial 242 into an automatic exposure control circuit 354.

When a film cartridge having the marker 2 and 8 representative of ASA 400 is inserted into the camera and when the film speed dial is turned to place the indicium "400" in registry with the index 243, energization of the solenoid Mg does not occur because the switch $S_{32}$ is opened by a cam disc 258 which is fixedly connected to the shaft of the film speed dial 242. In this case, a lamp L which is connected across the solenoid along with a resistor $R_1$ is not lighted on.

Now assuming that the necessary manipulation of the dial 242 has been overlooked to permit setting of any other film speed value than ASA 400, then the switch $S_{32}$ is closed causing the solenoid Mg and the lamp L to be energized when the film cartridge is inserted into the camera. As the solenoid Mg is energized, the latching lever 360 is actuated to prevent the operating member 368 from being moved in the direction A, thereby the shutter release or film winding mechanism is maintained inoperative. As the lamp L is energized, the operator is aware of the fact that the camera is adjusted to an improper film speed position. Upon readadjustment of the camera by operating the film speed dial 242 so as to effect lighting-off of the lamp L, the correct film speed information is introduced into the exposure control circuit 354 and the shutter release or film winding mechanism is released from the locked position.

In case where a cartridge having the marker contains a film of ASA 200, it is required to change the relative position of the cam disc 358 so that when the dial 242 is turned to place the indicium "200" in registry with the index 243, the switch $S_{32}$ is opened.

When a conventional film cartridge having no marker is inserted into the camera of the type described, the electrical contacts 24 and 25 remain insulated from each other because the wall of the film cartridge is usually coated with an electrically non-conductive material. In this case, therefore, the monitor and safety circuit is not sufferred from accidental actuation which would otherwise lead to the occurrence of unnecessary warning display, or to the incapability of operating the camera for photography.

According to the invention, it is made possible to make an exposure with improved reliability by use of the cartridge having the marker, as an actuation of shutter release is permitted to occur only when the proper film speed value is set by the dial. On the other hand, when an improper film speed value is selected by the dial, or when the necessary manipulation of the dial is overlooked, the monitor and safety device is automatically acted on to prevent incorrect exposure from occurring. Nevertheless, when the conventional cartridge is used, the camera may be operated in the conventional manner despite of the provision of such device.

The example of arrangement of the marker sensing means 24 and 25 of FIG. 23 is shown as to cooperate with the only one of the electrically conductive patches 2 and 8 of the marker which is positioned nearest to the lower side of the cartridge as viewed in the figure, in this instance, with the patch 2 on assumption that what all the markers available in the market represent is limited to ASA 400. If cartridges containing films having a different sensitivity, for example, of ASA 200 are provided with a marker different from the representative of ASA 400 in that the upper one of the patches is positioned as shifted from the upper patch 8 but identical therewith in that the lower patch 2 is located in the same position, the monitor and safety device of FIG. 23 will perform incorrect operation. To avoid this, the marker sensing electrical contacts 24 and 25 must be controlled in position to cooperate with respective patches 2 and 8 as shown by solid lines in FIG. 24. If the monitor and safety device is adapted for use with a marker representate of ASA 200, the one of the marker sensing contacts which is assigned to the upper patch 4 must change its position as shown by dashed lines 28, and the control switch 32 must be arranged to be opened with ASA 200 is selected by the film speed dial 242.

Figure 24:
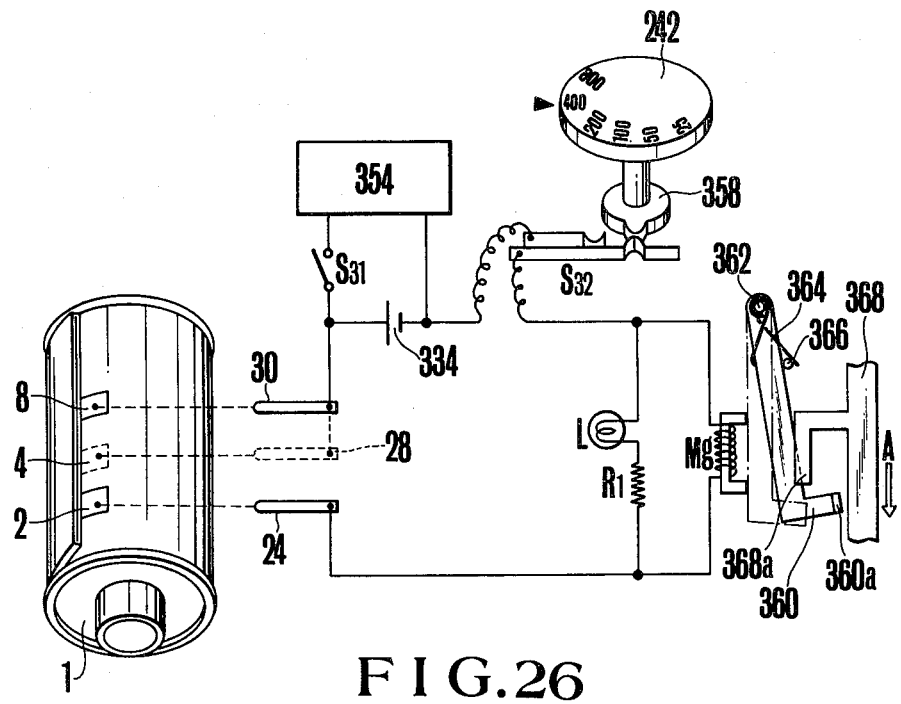
FIG. 24 is a similar view showing an example of modification in the device.
Figure 26:
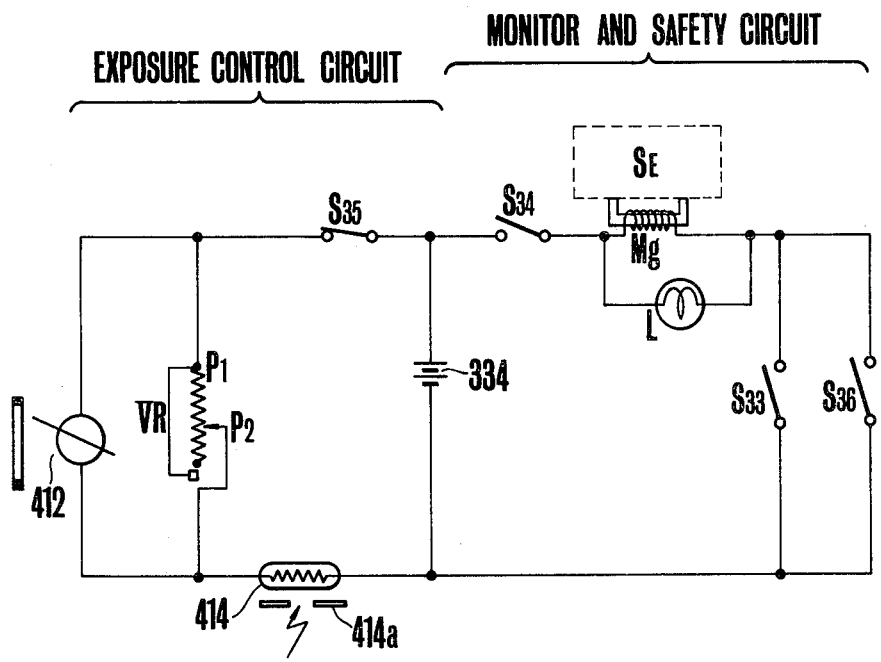
FIG. 26 is a circuit diagram of the device of FIG. 25.
Figure 25:
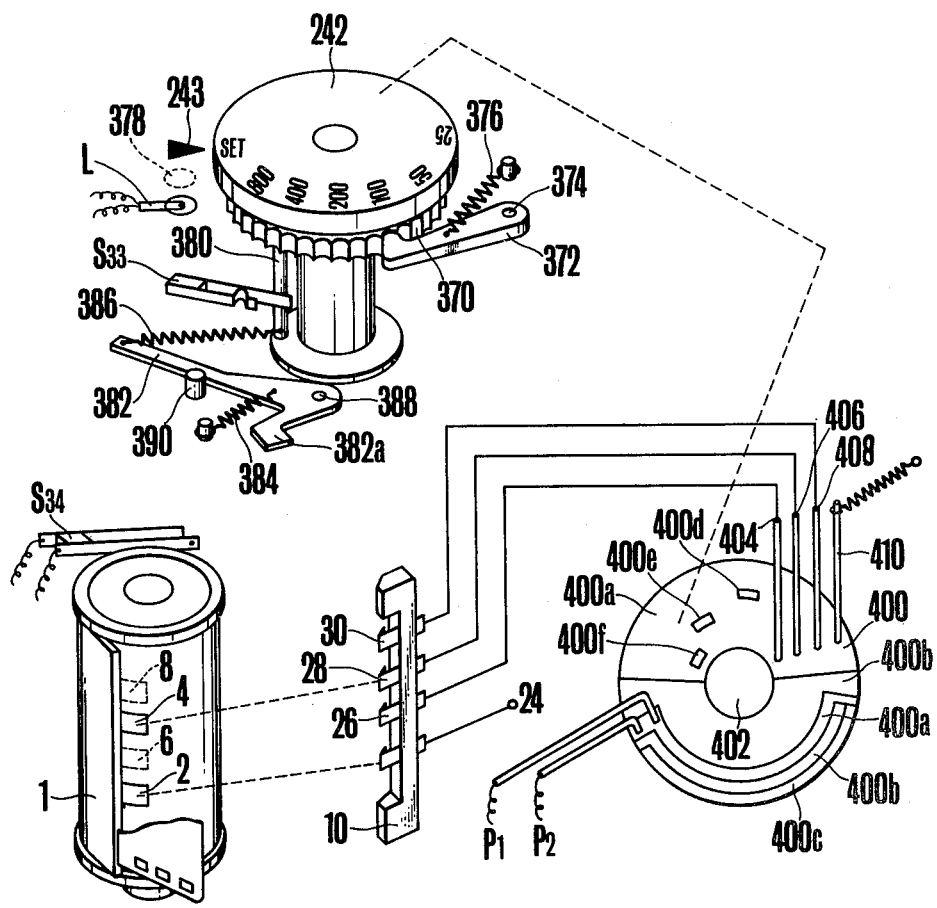
FIG. 25 is an exploded perspective view and electrical connection of another example of the film speed setting monitor and safety device adapted for selective use of different film speed markers and associated with a film speed dial mechanism capable of preventing the necessary manipulation from being overlooked.

FIGS. 25 and 26 show an improved monitor and safety device rendering it possible to perform the same function as that shown in connection with FIGS. 23 and 24 not only for ASA 400 but for any of the other various film speed values. This device includes a marker sensing mechanism which may be constructed in the same manner as that shown in connection with FIG. 2(a) or FIG. 2(c), and a scanning mechanism arranged on a disc 400 which is operatively connected to a manually operable film speed setting member or dial 242 as schematically shown by dashed lines and having stationary sliders 404, 406 and 408 which are electrically connected to the electrical contacts 26, 28 and 30 respectively upon detection of position of the marker patches by operating the dial 242 to actuate release of safety means SE similar in construction and arrangement to that shown in FIGS. 23 and 24. This scanning mechanism functions in a similar manner to that of the switch $S_{32}$ of FIGS. 23 and 24 and is therefore shown as a switch $S_{36}$ in FIG. 26. The sliders 404, 406, 408 and 410 are positioned in radially spaced relation to the axis 402 of the disc 400. On an almost half surface area of the disc 400 there are provided three electrically insulating islands 400d, 400e and 400f disposed so that when the dial 242 is turned to place an indicium "800," "400" or "200" in registry with a stationary index 243, the islands 400d, 400e and 400f are brought into contact with the sliders 404, 406 and 408 respectively, thereby the switch $S_{36}$ is opened in each case. On the other surface area of the disc 400 there are shown three concentrical tracks 400a, 400b and 400c made up of electrically conductive, insulating and resistant materials respectively and positioned in longitudinally contact relation to each other to constitute a variable resistor VR of FIG. 26 together with a pair of taps $P_1$ and $P_2$ which are positioned stationary in slidably riding relation to the tracks 400a and 400c respectively.

The film speed dial 242 has a number of discrete switched positions including a position designated SET to which the film speed dial 242 is automatically returned from any of the other positions for ASAs 25, 50, 100, 200, 400 and 800 when the back cover 44 of the camera is opened and is controlled in position by a crick lever 372 which is pivoted at 374 and biased by a spring 376 to tend to engage at its pawl with one of the teeth 370 formed in a lower peripheral portion of the dial 242. In order to drive the dial 242 for returning movement to SET position, there is provided a drive spring 384 connected between a stationary pin and a lever 382, the latter being arranged to take the illustrated position SET when the back cover 44 is moved away from the projection 382a and to permit movement of the dial 242 for manual setting of any one of the film speed values available thereon when the back cover 44 is closed to push the projection 382a against the force of the drive spring 384. To limit counter-clockwise movement of the lever 382 there is provided a stopper pin 390. As a motion transmitting means between the lever 382 and the dial 242 use is made of a wire 386 connected between the free end of the lever 382 and a pin 380 eccentrically downwardly extending from the lower surface of the dial 242. This pin 380 serves to close a switch $S_{33}$ when the dial 242 assumes the SET position. As shown in FIG. 26, the switch $S_{33}$ is connected in parallel with the switch $S_{36}$ so that when the switch $S_{33}$ is closed, the electromagnet Mg and the monitor lamp L are simultaneously energized provided that a film cartridge is seated in the chamber to close a switch $S_{34}$. The exposure control circuit includes a photo-sensitive element 414 positioned behind a diaghragm 414a, and an exposure meter 412 responsive to the combined output of the variable resistor VR and the photo-sensitive element 414 for controlling operation of exposure determining means such as shutter control means.

The operation of the device of FIGS. 25 and 26 is as follows: After the camera has been operated with the film speed dial 242 adjusted in position to the sensitivity of the used film, when the back cover 44 is opened, the return control lever 382 is turned in the counter-clockwise direction under the action of the drive spring 384, thereby the film speed dial 242 is driven for counter-clockwise movement to the SET position where the switch $S_{33}$ is closed. Then a new cartridge of the conventional type having no marker will be loaded to close the switch $S_{34}$. At this time, the power supply circuit for the electromagnet Mg and lamp L is established so that the safety means SE is set in the active state and the lamp L emits light which can be seen by the operator looking at a window 378 near the index 243. By this, the operator is aware if the manipulation of the film speed dial 242 is necessary. When the dial 242 is turned to place the symbol SET out of registry with the index 243, the switch $S_{33}$ is opened to break the aforesaid power supply circuit, thus permitting for the operator to actuate a shutter release or a film winding operation, as the marker sensing electrical contacts are maintained non-conductive to each other at any position of the dial 242, in other words, the switch $S_{36}$ is maintained open throughout the entire range of film speed values. As the dial 242 is turned along with the disc 400, the taps $P_1$ and $P_2$ slide on the respective tracks 400a and 400c to vary the resistance of the variable resistor VR. Information of film speed is combined with information of object brightness and other necessary exposure control parameters to determine exposure of the used film to a given object by means of the meter 412, provided that a power supply control switch $S_{35}$ is closed.

If a cartridge having the marker, for example, with the patches 2 and 4 representing ASA 400 is intended to be used, the operator will first open the back cover 44 to effect automatic resetting of the dial 242 and then replace the so far loaded cartridge by the new one while the patches 2 and 4 of the marker being brought into contact with the sensing members 24 and 28 respectively as shown by dashed lines. Because of the connection of the sensing member 24 and the slide 410 to the negative and positive terminals of the battery 334, and of the location of the slide 406 in the common electrically conductive area of the slide 410, the switch $S_{36}$ is closed to establish the power supply circuit for the electromagnet Mg and lamp L regardless of the opening of the switch $S_{33}$ resulting from the out-of-registry of the symbol SET with the index 243. While looking at the light emanating from the window 378, the operator may turn the dial 242. Upon detection of occurrence of extinction of the lamp L, the turning movement of the dial 242 gets stopped with the resulting adjustment of position of the dial 242 being in registry at "400" with the index 243.

It will be appreciated from the foregoing that each time the back cover of the camera is opened for the purpose of loading the film cartridge, the film speed setting means is reset to the initial position where actuation of the monitor and safety device is controlled so that there is no possibility of overlooking the necessary manipulation of the film speed setting means independently of whether the film cartridge loaded is of the type having the marker. The use of the cartridge having the marker not only facilitates manual setting of the given film speed but also makes it possible to remember what speed the loaded film has and to prevent the camera from being operated with accidental incorrect adjustment of the film speed setting means. Instead of using the monitor lamp, it is possible to utilize the exposure meter in displaying the operating state of the safety means SE as the variable resistor for setting the film speed value in the exposure control circuit is connected across the winding of the exposure meter upon resetting of the film speed dial to the initial position to provide no resistance. Further the needle of the meter may be operatively connected to the safety means in the form of a release locking means of known construction so that when the deflected position of the needle is beyond the range of exposure values, the release locking means is actuated. In this case, there is no need to provide the monitor lamp and electromagnet Mg for the safety means SE. The power supply control switches $S_{34}$ and $S_{35}$ connected in the monitor and safety circuit and exposure control circuit respectively serve to minimize the consumption of electrical energy of the battery 334. Instead of using the window for the monitor lamp as being separate from the index for the film speed dial, this index may be made luminous when the lamp is energized. Further, instead of constructing the film speed dial from an opaque material, use is made of a transparent material to permit illumination of the indicia on the dial by the energized monitor lamp, thereby giving an advantage of reading out the selected film speed value in a dark environment, for example, in night photography.

Figure 27:
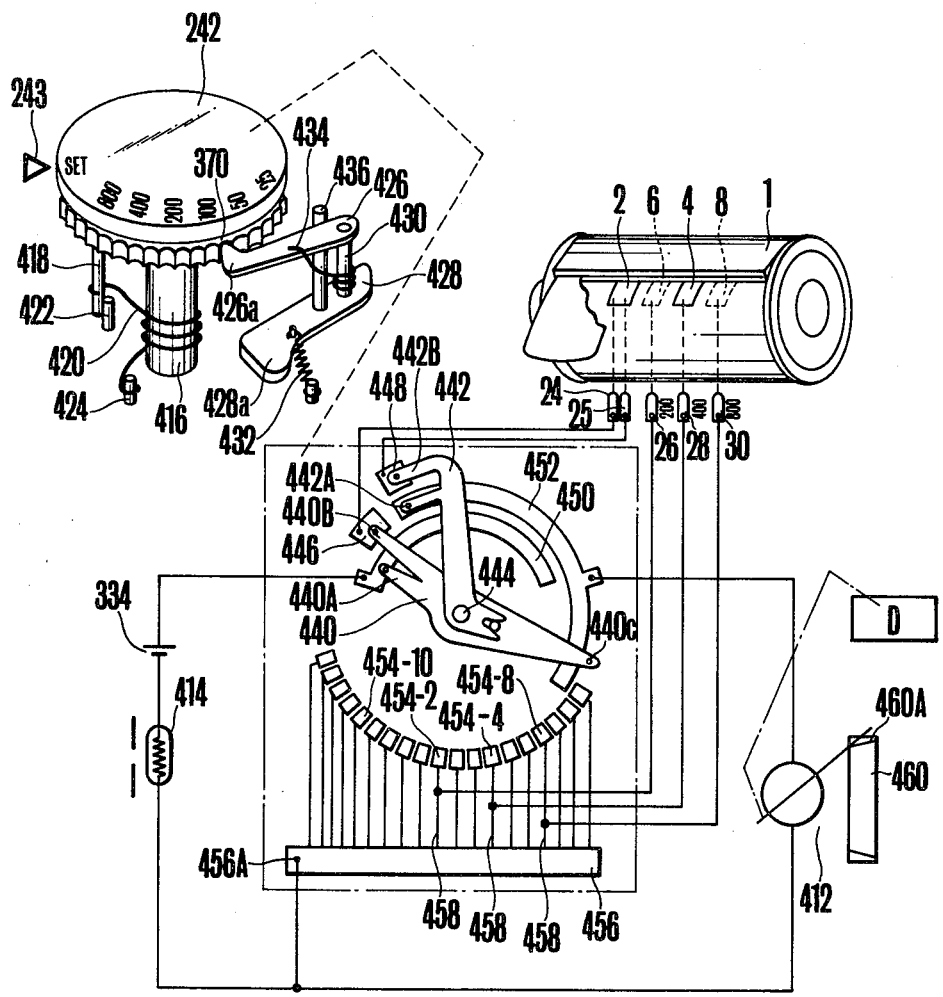
FIG. 27 is a partly exploded perspective and partly schematic view of a furthermore embodiment of the invention in which preference is given to manual setting.
Figure 28:
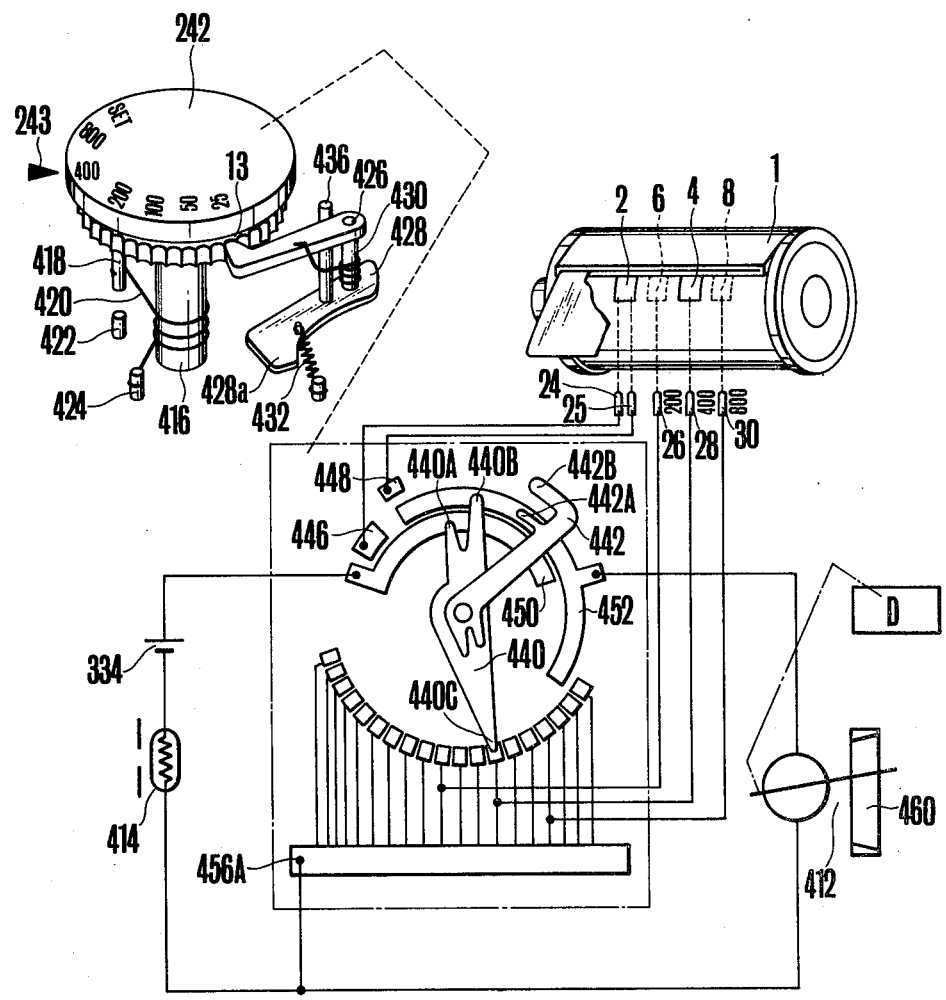
FIG. 28 is a similar view with the film speed dial manipulated to select a desired film speed.
Figure 29:
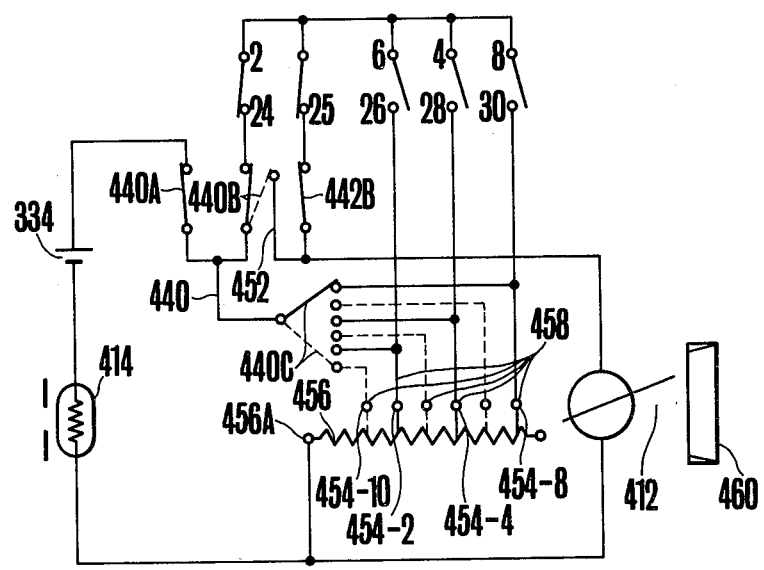
FIG. 29 is a circuit diagram of the device of FIGS. 27 and 28.

FIGS. 27, 28 and 29 show a furthermore embodiment of the invention in which when a cartridge having the marker is inserted into the camera, the given film speed value is automatically introduced into an exposure control circuit so long as the film speed dial remains in the initial or SET position, and in which a desired film speed value can be introduced by hand into the exposure control circuit regardless of whether or not the loaded cartridge is of the type having the marker.

The manually operable or automatic film speed setting mechanism of FIGS. 27 and 28 includes a film speed dial 242 having a number of switched positions including a position designated SET, a click lever 426 pivotal about an axel 430 and biased by a spring 434 to tend for normal abutting engagement with one of the teeth 370 formed in a lower peripheral portion of the dial 242, a return spring 420 convoluted around a shaft 416 of the dial 242 and connected at between a movable pin 418 eccentrically downwardly extending from the dial 242 and a stationary pin 424 mounted on the camera housing so that when the back cover 44 of the camera is opened, a sensing lever 428 is turned in a counter-clockwise direction about the common axel 430 of the click lever 426 under the action of a spring 432, thereby the click lever 426 is disengaged at its pawl 426a from the teeth 370 to permit returning movement of the dial 242 under the action of the return spring 420. This movement continues until the pin 418 abuts against a stopper pin 422, with the resulting position of the dial 242 where the symbol "SET" is in registry with the index 243. When the back cover 44 is closed, an acutating pin 436 upwardly extending from the sensing lever 428 is moved away from the path of movement of the click lever 436 so that the dial 242 is maintained stationary in the selected position as the pawl 426a of the click lever 426 is brought into braking engagement with one of the teeth 370.

As the dial 242 is turned by hand in a clockwise direction from "SET" position, a three-finger hand 440 and a two-finger hand 442 are turned altogether in a clockwise direction about a common shaft 444 from the illustrated position where the given film speed value is automatically set into the exposure control circuit as will be better understood when additional reference is had to FIG. 29.

With a film cartridge having the marker, for example, with patches 2 and 4 representing ASA 400 loaded in the camera, when the dial 242 is left unchanged from the initial or "SET" position, electrical power is supplied from the positive terminal of a battery 334 to an exposure meter 412 through a first conductive arcuate track 450, the three finger hand 440, a conductive square area 446, the marker sensing contact 24, the marker patch 2, the contact 25, a conductive square area 448, the two-finger hand 442 and a second conductive arcuate track 452. The electrical power is branched at the patch 2 to the patch 4 and therefrom directed through the marker sensing contact 28 to that point in a resistance track 456 which depends upon the particular film speed value, namely, ASA 400.

When the dial 242 is turned to place the symbol "SET" out of registry with the index 243, the finger 440B and 442B of the hands 440 and 442 are moved away from the respective electrically conductive areas 446 and 448, so that electrical power supply to the marker 2 and 4 is cut off. Upon further movement of the dial 242 to place an indicia, for example, "800" in registry with the index 243, the finger 440B rides on the second arcuate track 452 to establish again power supply from the battery 334 to the exposure meter 412 through the first arcuate track 450, the first finger 440A, the second finger 440B and the second arcuate track 452, while the third finger of the three-finger hand 440 is brought into contact with a terminal 454-8 of the resistance track 456. When the dial 242 is set in registry with "400" or "200", the third finger 440C is in contact with a terminal 454-4 or 454-2 respectively.

The exposure meter 412 is associated with a safety device D for preventing a shutter release or film winding operation from occurring when the needle of the meter 412 lies beyond the dynamic range of exposure control 460. This safety device D may be replaced by the monitor and safety device shown in FIGS. 23 and 24.

The operation of the system of FIGS. 27, 28 and 29 is as follows: After all the film has been exposed, the operator will open the back cover 44 to remove the film cartridge, causing counter-clockwise movement of the sensing lever 428 which in turn causes disengagement of the click lever pawl 426a from the tooth 370, thereupon the dial 242 is automatically returned to the initial position illustrated in FIG. 27. When a new film cartridge of the conventional type is loaded into the camera, the needle of the exposure meter 412 is deflected to a point 460A beyond the dynamic range of exposure control 460 because electrical power supply from the battery 334 to the exposure meter 412 is cut off at between the marker sensing electrical contacts 24 and 25. At this time, therefore, the safety device is actuated so that the shutter release button or film winding lever can not be operated. To account for the given film speed, for example, ASA 100, the operator will next turn the dial 242 to place an indicium "100" in registry with the index 243, thereby the three-finger hand 440 is turned to a position where the first and second fingers 440A and 440B ride on the first and second arcuate tracks 450 and 452 respectively and the third finger 440C is in contact with a terminal 454-10. Therefore, the resistance value determined by the length between the terminal 454-10 and the terminal end 456A of the resistance track 456 represents information of ASA 100. This information is combined with information of object brightness as sensed by a photo-sensitive element 414 to control the deflected position of the needle of the exposure meter 412.

After the dial 242 has been reset to the initial position designated SET automatically or manually, a film cartridge having the marker may be loaded into the camera with simultaneous occurrence of automatic setting of the given film speed value. At any desired time during the use of the film in the camera, the dial 242 may be operated to cancel the already introduced information of film speed by new one.

It will be seen from the foregoing that the present invention provides a manually operable or automatic film speed setting system capable of using any type film cartridge. When the film cartridge of the type having the marker is used, the given film speed is automatically set in the exposure control circuit. When the film cartridge of the conventional type having no marker is used, the monitor and safety device is rendered operative so that there is no possibility of overlooking the necessary manipulation of the dial 242. Even when the cartridge having the marker is used, it is possible to manually set a desired film speed as different from the given film speed. Further, in this embodiment, the single variable resistor is employed for either of the automatic and manual settings of film speeds to facilitate reduction of complexity of the structure of the system.

What is claimed is:

1. A film sensitivity setting system for a camera comprising:

1. a camera body having:

(a) light measuring means for producing an electrical signal representative of the level of brightness of an object to be photographed;
(b) exposure value computing means having a reference signal producing means and receptive of the output of said light measuring means for computing an exposure value;
(c) memory means for memorizing the output of said exposure value computing means;
(d) changeover means responsive to the release actuation of the camera for changing over the outputs of said exposure value computing means and memory means;
(e) manual film sensitivity setting means cooperative with an operating member manually operable from the outside of the camera for producing an electrical signal corresponding to the set film sensitivity value; and
(f) comparing means having a reference signal producing means for producing shutter time information;
2. automatic film sensitivity setting means including:
(a) film signal sensing means having sensing terminals arranged to contact with a signal part provided on a film container;
(b) film sensitivity information producing means having a plurality of time constant circuits connected to the sensing terminals of said sensing means;
(c) film sensitivity information output control means connected to said sensing means and said time constant circuit group and responsive to the output of said sensing means for controlling the output of the time constant circuit; and
(d) manual setting means ineffecting means connecting to said manual film sensitivity setting means and said film sensitivity information producing means and responsive to the output of said sensing means for rendering ineffective the output of said manual film sensitivity setting means; and
3. circuit changeover means selectively connecting the manual film sensitivity setting means and the film sensitivity information producing means with comparing means and operating in response to the output of said sensing means.

2. A film sensitivity setting system according to claim 1, further including:
(a) exposure level correcting means including
(i) exposure level correction information producing means cooperative with an operating member manually operable from the outside of the camera and having converting means for producing an electrical signal corresponding to the correction information; and
(ii) correction information control means connected to said correction information producing means and said exposure value computing means for introducing correction information into said exposure value computing means to perform correction of exposure level.

3. A film sensitivity setting system according to claim 1, further comprising auto-film display means which displays that an auto-film is in use, said means including:
(1) a film counter mechanism which counts the number of film frames in response to a film winding operation of the camera;
(2) switch means which opens in response to the counting action of said film counter mechanism when a predetermined number of film frames have been counted after commencement of the count; and
(3) light-emitting display means connected to said automatic film sensitivity setting means through said switch means, said light-emitting display means being arranged to receive the output signal of said automatic film sensitivity setting means to display that the auto-film is in use by emitting a light in response to said signal until a predetermined number of film frames are counted by said film counter mechanism.

4. A film sensitivity setting system according to claim 1, wherein said switching means have multi-collector transistor elements.

5. A film sensitivity setting system for a camera comprising:
(a) film sensitivity signal sensing means having a plurality of sensing terminals arranged to contact with a signal part of a film container and constituting switching means of which opening and closing operation is controlled by the signal part of the film container;
(b) switching means cooperative with a manually operable film sensitivity setting dial to be opened when a predetermined film sensitivity value is selected; and
(c) monitoring means having a light-emitting element positioned to constitute a closed circuit together with said sensing terminals and said switching means so that the energization of said light-emitting element is controlled by said manually operable film sensitivity setting dial.

6. A film sensitivity setting system according to claim 5, further including:
camera operation inhibiting means having:
(a) a magnet means connected in parallel with said light-emitting element upon power supply of said closed circuit to be controlled for energization; and
(b) a shutter release inhibiting member arranged to be attracted by the energized magnet means to inhibit actuation of shutter release.

7. A film sensitivity setting system for a camera comprising:
1. a camera body having exposure control means responsive to the object brightness, and shutter time control information, or diaphragm control information for controlling exposure;
2. manual film sensitivity setting means having:
(a) a manually operable film sensitivity setting dial; and
(b) first converting means connected to an exposure value computing means for producing an electrical signal corresponding to the amount of rotation of said dial;
3. film sensitivity resetting means having:
(c) a rotatable lever arranged to be rotated in response to opening and closing operation of the back cover of the camera; and
(d) a driving member for said manual setting dial cooperative with said rotatable lever upon opening and closing operation of the back cover of the camera to reset said manual setting dial to the initial position; and
4. film sensitivity monitoring means having:

(e) film sensitivity signal sensing means having sensing terminals arranged to contact with a signal part of the film container;
(f) light-emitting means arranged to be energized when the dial is in the initial position; and
(g) switching means connected to said light-emitting means upon rotation of said dial to control electrical power supply to said light emitting means.

8. A film sensitivity setting system according to claim 7, wherein said switching means of said film sensitivity monitoring means comprises:
(a) a conductive terminal arranged to contact with the sensing terminal of said film signal sensing means; and
(b) a rotary member having conductive and insulating parts arranged in contact with the opposite end of said conductive terminal upon rotation of said dial to control electrical power supply to said light emitting means.

9. A film sensitivity setting system according to claim 7, further including camera operation inhibiting means having:
(a) a magnet means connected in parallel with said light-emitting means upon closure of said switching means to be controlled for energization;
(b) a shutter release inhibiting member arranged to be attracted by the energized magnet means to inhibit actuation of shutter release.

10. A film sensitivity setting system according to claim 7, further including film container sensing means connected to said film sensitivity sensing monitoring means upon detection of whether or not the film container is loaded in the camera to control electrical power supply to said monitoring means.

11. An automatic film sensitivity setting system for a camera having a control circuit which performs exposure control according to information related to the brightness of an object to be photographed, said system comprising:
(a) an automatic film sensitivity setting circuit including:
(1) film sensitivity signal sensing means having a plurality of sensing terminals arranged to contact with a signal part of a film container and constituting contact means, the contact operation of which is controlled by the signal part of the film container; and
(2) first converting means for producing an electrical signal corresponding to the sensitivity of film for automatic setting, the first converting means being arranged to produce film sensitivity information corresponding to each of said contact means;
(b) manual film sensitivity setting means having second converting means for forming an electrical signal representative of a film sensitivity value and arranged to cooperate with an operating member and being manually operable from the outside of the camera; and
(c) automatic film sensitivity selecting means provided with cut-off means which automatic film sensitivity selecting means is connected to said manual film sensitivity setting means to cut off the supply of the output signal of said manual film sensitivity setting means in response to the output signal of said first converting means.

12. An automatic film sensitivity setting system according to claim 11, wherein said cut-off means which cuts off the output signal of said manual film sensitivity setting means includes a semiconductor switching circuit.

13. An automatic film sensitivity setting system according to claim 11, wherein said first converting means is formed by connecting a plurality of resistors in series, said resistors being connected according to the positions in said signal part of the film container at which said sensing terminals of the film sensitivity signal sensing means come into contact, said first converting means being arranged to produce an electrical signal corresponding to a composite value of said resistors.

14. An automatic film sensitivity setting system according to claim 11, wherein said film sensitivity signal sensing means are arranged so that said sensing terminals are insulated by an insulating member and are rotatably carried by a shaft in the vicinity of a film container loading chamber of the camera so as to be caused to rotate in the direction in which they are caused to come into contact with said signal part of the film container by a closing action of a rear cover of the camera.

15. An automatic film sensitivity setting system according to claim 11, wherein said film sensitivity signal sensing means are arranged so that one end of each of said sensing terminals is fixedly supported while the other end thereof protrudes from an opening provided in the circumferential wall of a cartridge chamber into the chamber and is urged toward the bottom part of the chamber to come into resilient contact with said signal part which is provided on a outer circumferential face of the film container.

16. An automatic film sensitivity setting system according to claim 11, further comprising display means which displays the fact that an auto-film is in use, said display means including:
(a) a film counter mechanism which counts the number of film frames in response to a film winding operation of the camera;
(b) switch means which opens in response to the counting action of said film counter mechanism when a predetermined number of film frames have been counted after commencement of the count; and
(c) light-emitting display means connected to said automatic film sensitivity setting circuit through said switch means, said light-emitting display means being arranged to have power supply thereto controlled through said switch means until a predetermined number of film frames have been counted by said film counter mechanism and to display that an auto-film is in use by emitting a light in response to the output signal of said automatic film sensitivity setting circuit, emission of the display light being stopped by an opening action of said switch means.

17. An automatic film sensitivity setting system for a camera according to claim 11, further including confirming means for confirmation of the type of film with which the camera is loaded, said means being provided with a switching means which can be opened and closed from the outside of the camera and with light-emitting display means which is connected to said automatic film sensitivity setting circuit through said switching means to have power supply thereto controlled by the switching means, said light-emitting display means being caused by closing of said switching means to display with emission of a light the use or non-use of an auto-film.

18. An automatic film sensitivity setting system according to claim 11, further including display means for displaying the sensitivity of the auto-film with which the camera is loaded, said means being provided with:
   (a) a film sensitivity confirmation switch which can be opened and closed from the outside of the camera; and
   (b) a group of light-emitting elements which are arranged on the top panel of a camera housing and are electrically connected between said film sensitivity confirmation switch and each switching means, said light-emitting elements being arranged to have power supply thereto controlled by closing of said film sensitivity confirmation switch in such a manner that a light-emitting element representative of a film sensitivity value corresponding to the sensing terminal which is closed by said switching means comes to emit a light to display the sensitivity of film in said film container with which the camera is loaded.

19. An automatic film sensitivity setting system according to claim 11, wherein said film sensitivity signal sensing means has the following structural arrangement:
   (a) an engaging abutment part is provided adjacent to the film container loading chamber of the camera for carrying the film exit part of said film container by engaging therewith; and
   (b) one end of each of said sensing terminals being secured to a circumferential wall portion of the film container loading chamber and the other end extends in the direction of said engaging part to come into contact with said signal part formed at the film exit part of said film container when the film container is mounted on the camera.

20. An automatic film sensitivity setting system according to claim 19, further having the following structural arrangement:
   on the inner side of the rear cover of the camera, there is provided a presser which presses one end of each of said sensing terminals extending to the engaging part of the film exit part against a marker formed at said film exit part.

21. An exposure control system for a camera comprising:
   1. manual film sensitivity setting means having a first converting means for forming an electrical signal representative of a film sensitivity and being arranged to cooperate with an operating member manually operable from the outside of the camera;
   2. automatic film sensitivity setting means including:
      (a) film sensitivity signal sensing means having a plurality of sensing terminals arranged to contact with a signal part of a film container and constituting contact means, the contact operation of which being controlled by the signal part of said film container; and
      (b) second converting means for producing an electrical signal corresponding to the sensitivity of film adapted for automatic film sensitivity setting, said second converting means being arranged to produce film sensitivity information based on the operation of said contact means;
   3. exposure control means electrically connected to said manual film sensitivity setting means and to said automatic film sensitivity setting means, said exposure control means including:
      (a) light measuring means for measuring the brightness of an object to be photographed;
      (b) shutter time information producing means having third converting means for producing an electrical signal corresponding to a setting value of shutter time; and
      (c) exposure value computing means connected to said light measuring means and said shutter time information producing means and selectively connected to said manual film sensitivity setting means or to said automatic film sensitivity setting means to compute an exposure value required for effecting proper exposure; and
   4. automatic film sensitivity selecting means which is connected to said manual film sensitivity setting means and to automatic film sensitivity setting means and is provided with cut-off switching means which cuts off the output signal of said manual film sensitivity setting means according to the contact operation of said contact means to prevent it from being supplied to said exposure control means.

22. An exposure control system according to claim 21, including display means which displays that an auto-film is in use, said display means comprising:
   (a) a film counter mechanism which counts the number of film frames in response to a film winding operation of the camera;
   (b) switch means which opens in response to the counting action of said film counter mechanism when a predetermined number of film frames have been counted after commencement of the count; and
   (c) light-emitting display means connected to said automatic film sensitivity setting means through said switch means, said light-emitting display means being arranged to have power supply thereto controlled through said switch means until a predetermined number of film frames have been counted by said film counter mechanism and to display that an auto-film is in use by emitting a light in response to the output signal of said automatic film sensitivity setting means, the emission of the display light being arranged to be stopped by an opening action of said switch means.

23. An exposure control system according to claim 22, further including confirming means for confirming that an autofilm is in use, said means being provided with a second switch means which is connected in parallel to said switch means and is operable from the outside of the camera for confirmation of the use or non-use of an auto-film by said light-emitting display means through the output signal of the automatic film sensitivity setting means.

24. An exposure control system for a camera which permits automatic film sensitivity setting, said system comprising:
   1. manual film sensitivity setting means having a first converting means for forming an electrical signal representative of a film sensitivity value, said setting means being arranged to cooperate with an operating member manually operable from the outside of the camera;
   2. automatic film sensitivity setting means including:
      (a) film sensitivity signal sensing means having a plurality of sensing terminals arranged to contact with a signal part of a film container and constituting contact means, contact operation of which is controlled by the signal part of the film container; and
  (b) second converting means for producing an electrical signal corresponding to the sensitivity of film adapted to automatic film sensitivity setting, said means thus being arranged to provide film sensitivity information based on the contact operation of said contact means;
3. automatic film sensitivity selecting means which is connected to said manual film sensitivity setting means and so said automatic film sensitivity setting means and is provided with switching means for cutting off the output signal of said manual film sensitivity setting means is response to the output signal of said automatic film sensitivity setting means;
4. an exposure level correcting circuit including:
  (a) exposure level correction information producing means cooperative with an operating member manually operable from the outside of the camera and having third converting means for producing an electrical signal corresponding correction information; and
  (b) a first computing circuit selectively connected to said manual film sensitivity setting means, to said automatic film sensitivity setting means or to said exposure level correcting circuit to compute and control, according to the output of said automatic film sensitivity selecting means, a film sensitivity value manually set or automatically set through an auto-film and the exposure level correction information; and
5. exposure control means connected to said exposure level correcting circuit, said means including:
  (a) light measuring means for measuring the brightness of an object to be photographed;
  (b) exposure factor information input means having fourth converting means for producing an electrical signal corresponding to set exposure factor information; and
  (c) exposure valve computing means provided with second computing mean which performs exposure computation by receiving signals from said light measuring means, said exposure factor information input means and said first computing means, said exposure valve computing means thus being arranged to produce exposure information based on a film sensitivity setting value obtained either manually or automatically.

25. An exposure control system for a camera according to claim 24, further including exposure level display means provided with light-emitting display means connected to said exposure level correction information producing means, said level display means thus being arranged to display, by emitting a light, an exposure level corrected in response to the signal from said exposure level correction information producing means.

26. A film sensitivity setting system for a camera which permits the mounting of a flash device thereon, said system comprising:
  (a) manual film sensitivity setting means having a first converting means for forming an electrical signal representative of a film sensitivity value, said setting means being arranged to cooperate with an operating member manually operable from the outside of the camera;
  (b) automatic film sensitivity setting means including:
    (1) film sensitivity signal sensing means having a plurality of sensing terminals arranged to contact with a signal part of a film container and constituting contact means, the contact operation of which is controlled by the signal part of said film container; and
    (2) second converting means for producing an electrical signal corresponding to the sensitivity of film adapted for automatic film sensitivity setting, said means thus being arranged to provide film sensitivity information based on the contact operation of said contact means;
  (c) automatic film sensitivity selecting means which are connected to said manual film sensitivity setting means and to said automatic film sensitivity setting means and are provided with switching means for cutting off the output signal of said manual film sensitivity setting means in response to the output signal of said automatic film sensitivity setting means;
  (d) shutter time information producing means for flash photography, said means being arranged to produce fixed shutter time information;
  (e) range adjustment information input means for producing an electrical signal in response to a range adjusting operation;
  (f) an electrical signal terminal provided for connecting said range adjustment information input means to said flash light device to supply the flash information of the flash device to the camera; and
  (g) exposure control means provided for computing a correct diaphragm aperture value by receiving information of said manual film sensitivity setting means or said automatic film sensitivity setting means according to the operation of said automatic film sensitivity selecting means and also by receiving said fixed shutter time information, range information and information of the flash of said flash light device.

27. A film sensitivity setting system according to claim 26, further including:
  (a) light measuring means for measuring the brightness of an object to be photographed; and
  (b) switching means operable from the outside of the camera, said switching means being arranged to selectively supply information produced by said light measuring means, range adjustment information produced by said range adjustment information input means or flash light information of said flash light device to said exposure control means to effect thereby shifting between flash light and daylight photographing operations.

28. An exposure control system for a camera which permits both automatic and manual setting of film sensitivity information, said system comprising:
  (a) a light measuring circuit for measuring the brightness of an object to be photographed;
  (b) manual aperture setting value information input means having a first converting means, said input means being arranged to produce an electrical signal corresponding to information of the setting aperture value;
  (c) a manual film sensitivity setting circuit having a first time constant circuit which, by action of an operating member operable from the outside of the camera, produces an electrical signal corresponding to the setting value of said operating member;

(d) a computation circuit which receives signals from said manual setting aperture value information input means and from said light measuring circuit and produces exposure information corresponding to brightness information and the aperture setting value;

(e) automatic film sensitivity setting means including:
  (1) film signal sensing means having sensing terminals which are capable of contacting a signal part which is provided on a film container representing the sensitivity of the film contained in said film container; and
  (2) electrical signal producing means for producing an electrical signal corresponding to the sensitivity of a film adapted for automatic film sensitivity setting;

(f) manual exposure time information producing means arranged to produce exposure time information corresponding to the exposure information produced by said computation circuit and to the manual setting film sensitivity information produced by said manual film sensitivity setting means;

(g) automatic exposure time information producing means arranged to produce exposure time information corresponding to the exposure information produced by said computation circuit and to the sensitivity information on the film adapted for automatic film sensitivity setting produced by said automatic film sensitivity setting means;

(h) shutter means;

(i) shutter control means electrically connected selectively to said manual exposure time information producing means or to said automatic exposure time information producing means, said control means being arranged to control said shutter means according to the exposure time information produced by either said manual or automatic exposure time information producing means; and (j) automatic film sensitivity selecting means which is provided with a circuit electrically connected to said manual film sensitivity setting circuit and to said automatic film sensitivity setting means to render said manual film sensitivity setting circuit inoperative in response to the output signal of said automatic film sensitivity setting means and which is also provided with switching means arranged to selectively connect said manual exposure time information producing means or said automatic exposure time information producing means to said shutter control means, said automatic film sensitivity selecting means being arranged to control said circuit and said switching means in response to the output signal of said automatic film sensitivity setting means.

29. An exposure control system for a camera according to claim 28, further comprising display means which displays that an auto-film is in use, said display means including:
(a) a film counter mechanism which counts the number of film frames in response to a film winding operation of the camera;
(b) switch means which opens in response to the counting action of said film counter mechanism when a predetermined number of film frames have been counted after commencement of the count; and
(c) light-emitting display means connected to said automatic film sensitivity setting means through said switch means, said light-emitting display means being arranged to receive the output signal of said automatic film sensitivity setting means to display that the auto-film is in use by emitting a light in response to said signal until a predetermined number of film frames are counted by said film counter mechanism.

30. A film sensitivity setting system for a camera, comprising:
(a) a camera body having exposure value computing means responsive to the brightness information of an object to be photographed, shutter control information and diaphragm control information for determining the amount of exposure of film;
(b) converting means which produces information on the sensitivity of film which requires manual sensitivity setting or that of film which is adapted for automatic film sensitivity setting;
(c) charge means provided with a charge member which moves to a preset position in response to an opening or closing action of the rear cover of the camera, said charge member being arranged to be engageable with said converting means and to be capable of performing a reset action on said converting means by charging the converting means to move to a preset position in response to the opening or closing action of the rear cover of the camera;
(d) manual film sensitivity setting means provided with an operating member for manual setting, said operating member being arranged to produce an electrical signal corresponding to the manual setting value of film sensitivity in response to the operation of said converting means; and
(e) automatic film sensitivity setting means including:
  (1) film signal sensing means including a plurality of sensing terminals arranged to contact with a signal part of a film container and constituting contact means, the contact operation of which is controlled by said signal part of the film container; and
  (2) auto-film detecting means having detection means which automatically detects the autofilm under the control of said film signal sensing means, and operating means for automatic film sensitivity setting which engages said converting means in accordance with a detection signal produced by said detection means and which generates an electrical signal corresponding to the sensitivity of film adapted for automatic film sensitivity setting.

31. A film sensitivity setting system according to claim 30, wherein said detecting means further includes electromagnetic means, the operation of which is controlled by said film signal sensing means and switch means which is opened and closed by the operation of said operating means for automatic film sensitivity setting to perform control of power supply to said electromagnetic means.

32. A film sensitivity setting system according to claim 30, further including film sensitivity information display means having:
(a) a display part which displays film sensitivity graduations in such a manner that the display is observable from the outside of the camera;
(b) manual film sensitivity setting value indicating means which indicates a manual setting value of film sensitivity by moving said display part in response to said manual film sensitivity setting means; and (c) automatic film sensitivity setting value indicating means which moves together with said operating means for automatic film sensitivity setting to evacuate said manual film sensitivity setting value indicating means to the outside of the visually observable range of said display part in response to the operation of said operating means for automatic film sensitivity setting.

33. A film sensitivity display device for a camera which permits the use of both a high sensitivity film and a low sensitivity film, said device comprising:

(a) film sensitivity display means provided with a meter which displays film sensitivity in such a manner as to permit observation from the outside of the camera;

(b) first converting means which receives information of the brightness of an object to be photographed in a low brightness range and which produces an electrical signal corresponding to the object's brightness level;

(c) second converting means which is connected in parallel with said first converting means and receives the object's brightness in a high brightness range to produce an electrical signal corresponding to the object's brightness level;

(d) contact means having sensing terminals arranged to contact with a signal part provided on a film container, said sensing terminals being electrically connected to said second converting means; and (e) film sensitivity detecting means which is electrically connected in parallel with both said first and second converting means and is provided with first and second signal forming means for producing electrical signals corresponding to the sensitivity values of the high and low sensitivity films and also with switching means which permits operation thereof from the outside of the camera to effect switching between the electrical connection of said first and second converting means to said film sensitivity display means and the electrical connection of said first and second signal forming means to said film sensitivity display means.

34. Film sensitivity setting means for a camera which permits the use of both a high sensitivity film and a low sensitivity film, said means comprising:

a camera body having an exposure meter circuit responsive to the information of the brightness of an object to be photographed, shutter time control information and diaphragm control information for determining the amount of exposure of the film;

first converting means connected to a light receiving element which receives a light from the object and to said exposure meter circuit to produce information on the film sensitivity in a low sensitivity range;

second converting means connected to said light receiving element and to said exposure meter circuit to produce information of the film sensitivity in a high sensitivity range;

first switching means having sensing terminals arranged to contact with a signal part provided on a film container;

automatic film sensitivity information selecting means electrically connected to said first and second converting means and to said first switching means, said selecting means being provided with transistor switching means which cuts off the signal of said first converting means in accordance with the opening or closing operation of said first switching means; and second switching means having a switch which is operable from the outside of the camera and is connected in parallel with said first switching means, said second switching means being arranged to cause said selecting means to cut off the signal of said first converting means when the camera is loaded with a film container containing a high sensitivity film and having no signal part and thus to supply information on said high sensitivity film to said exposure meter circuit.

35. A film sensitivity setting system for a camera comprising:

(a) a camera body having exposure control means responsive to information on the brightness of an object to be photographed and to shutter time control information or diaphragm control information for controlling exposure;

(b) manual film sensitivity setting means provided with a film sensitivity setting dial which is manually operable and reset means which resets said dial in response to the opening and closing actions of the rear cover of the camera;

(c) converting means which produces electrical signals corresponding to manual film sensitivity setting information and to automatic film sensitivity setting information, said converting means being arranged to be electrically connected to said exposure control means in response to a manual setting operation of said dial and being arranged to produce this film sensitivity information corresponding to the value of said manual setting operation (d) automatic film sensitivity setting means provided with:

(1) film sensitivity signal sensing means having a plurality of sensing terminals arranged to contact with a signal part of a film container and constituting contact means, the contact operation of which is controlled by the signal part of the film container; and (2) one end of said contact means being electrically connected to said exposure control means, the other end of said contact means being electrically connected to said converting means according to the position of the signal part of said film container to produce film sensitivity information corresponding to the contact operation of said contact means; and (e) display means which is electrically connected to the exposure control means and for indicating an exposure value in correspondence with the sensitivity of the charged film.

36. A film sensitivity sensing system having a film sensitivity display means comprising:

(A) a camera body having:

exposure value computing means responsive to the object brightness, shutter time control information and diaphragm control information for determining the amount of exposure of the film including:

(a) first converting means receiving object brightness in a low sensitivity range to produce an electrical signal corresponding to the object brightness level;

(b) second converting means connected in parallel with said first converting means and receiving object brightness in a high sensitivity range to produce an electrical signal corresponding to the object brightness level;

(c) exposure control means having a condenser connected to said first and said second converting means and connected to said exposure value computing means to produce an exposure control signal; and (d) first switching means having sensing terminals arranged to contact with a signal part provided on a film container, said sensing terminals being electrically connected between said second converting means and said condenser; and (B) film sensitivity display means having:

(a) first display means for displaying the loading of a low speed film;

(b) second display means for displaying the loading of a high speed film; and (c) sensing circuit means having second switching means connected to said first switching means for controlling power supply to said first and said second display means and responsive to the output signal of said sensing terminals for selectively energizing said first or said second display means for display operation.

37. An automatic film sensitivity system for a camera having a control circuit which performs exposure control according to information related to the brightness of an object to be photographed, said system comprising:

(a) an automatic film sensitivity setting circuit including:

(1) film sensitivity information sensing means having a sensing member arranged to receive a signal part of a film container; and (2) first converting means for producing a converted signal corresponding to the signal part of the film container for automatic setting, the first converting means being arranged to produce film sensitivity information corresponding to the signal of the sensing member;

(b) manual film sensitivity setting means having second converting means for forming a converted signal representative of a film sensitivity value and arranged to cooperate with an operating member and being manually operable from the outside of the camera; and (c) mode selection means which, in response to the signal of said automatic film sensitivity setting circuit, nullifies the output signal of said manual film sensitivity setting means to bring the camera into an automatic setting mode.

* * * * *